US012540928B2

(12) United States Patent
Lin et al.

(10) Patent No.: US 12,540,928 B2
(45) Date of Patent: Feb. 3, 2026

(54) METHOD FOR DESIGN AND ANALYSIS ON MULTI-COLUMN CONTINUOUS CHROMATOGRAPHY

(71) Applicant: ZHEJIANG UNIVERSITY, Hangzhou (CN)

(72) Inventors: Dong Qiang Lin, Hangzhou (CN); Ce Shi, Hangzhou (CN); Shan Jing Yao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 822 days.

(21) Appl. No.: 17/623,403

(22) PCT Filed: Sep. 5, 2019

(86) PCT No.: PCT/CN2019/104488
§ 371 (c)(1),
(2) Date: Dec. 28, 2021

(87) PCT Pub. No.: WO2020/258515
PCT Pub. Date: Dec. 30, 2020

(65) Prior Publication Data
US 2022/0381751 A1 Dec. 1, 2022

(30) Foreign Application Priority Data

Jun. 28, 2019 (CN) .......................... 201910573074.7
Jun. 28, 2019 (CN) .......................... 201910573256.4

(51) Int. Cl.
*G01N 30/86* (2006.01)
*B01D 15/18* (2006.01)
*G06F 17/00* (2019.01)

(52) U.S. Cl.
CPC ..... *G01N 30/8658* (2013.01); *G01N 30/8693* (2013.01); *B01D 15/1871* (2013.01); *G06F 17/00* (2013.01)

(58) Field of Classification Search
USPC ........................................................ 702/120
See application file for complete search history.

(56) References Cited

U.S. PATENT DOCUMENTS

2010/0004907 A1* 1/2010 Kidal ................. G01N 30/8693
703/2
2017/0166606 A1* 6/2017 Villain ............... B01D 15/1871
(Continued)

*Primary Examiner* — Paul D Lee
(74) *Attorney, Agent, or Firm* — Muncy, Geissler, Olds & Lowe, P.C.

(57) ABSTRACT

The present invention discloses a method for realizing multi-column continuous chromatography design and analysis based on a chromatography model, and a method for realizing multi-column continuous chromatography design and analysis based on an artificial neural network. The method based on the chromatography model includes the following steps: step 101, experimental breakthrough curve fitting: performing fitting using a chromatography model to obtain model parameters; step 102: breakthrough curve prediction: substituting the model parameters into the chromatography model to obtain a breakthrough curve under different operation conditions; step 103, process analysis of continuous chromatography: substituting the predicted breakthrough curve and the continuous chromatography operation parameters into a continuous chromatography model to obtain performance indexes such as process productivity and resin capacity utilization; and step 104, operation space optimization of continuous chromatography: obtaining the operation space of the continuous chromatography design parameters based on a specific separation target. The method based on the artificial neutral network (Continued)

completes the respective steps above by replacing the chromatography model with artificial neural network.

7 Claims, 14 Drawing Sheets

(56) References Cited

U.S. PATENT DOCUMENTS

| | | | |
|---|---|---|---|
| 2018/0051054 A1* | 2/2018 | Vetter | B01D 61/145 |
| 2018/0340917 A1* | 11/2018 | Lacki | B01D 15/1871 |
| 2022/0214319 A1* | 7/2022 | Schwellenbach | G01N 30/8658 |

* cited by examiner

METHOD FOR DESIGN AND ANALYSIS ON MULTI-COLUMN CONTINUOUS CHROMATOGRAPHY

TECHNICAL FIELD

The present invention relates to protein chromatography in the biochemical engineering and bioengineering fields, and in particular to a method for design and analysis on multi-column continuous chromatography, including a method for realizing multi-column continuous chromatography design and analysis based on a chromatography model, and a method for realizing multi-column continuous chromatography design and analysis based on an artificial neural network.

BACKGROUND

Continuous manufacturing processes have been widely used in petrochemical engineering, food and chemical industry. But the continuous process technology started relatively late in the field of biotechnology and thus, is not mature enough technically. In recent years, a novel continuous process-multi-column periodic counter-current chromatography, also called continuous chromatography, has been successfully applied in protein separation, in particular to the Protein A affinity capture process of antibody. A conventional antibody downstream separation process is a three-step batch chromatography technology based on Protein A affinity capture. However, due to limited process efficiency, it is difficult to match the fast-growing process productivity of upstream cell culture. On the other hand, Protein A affinity resins are very expensive; and the capacity utilization for the conventional batch chromatography is only 60% around. Therefore, it is necessary to improve the capacity utilization of Protein A affinity resin, thus decreasing the resin cost.

The basic principle of the continuous chromatography is as follows: sample feeding is performed using two columns interconnected, and a second column is used to receive protein breakthrough from the first column; then the first column terminates the sample feeding at a suitable breakthrough percentage and switches to the second column for disconnected sample feeding; the first column is then eluted and regenerated. Continuous operation is achieved by multi-column alternation, thereby improving the process productivity and resin capacity utilization, and decreasing the consumption of buffer and equipment size. Patent (U.S. Pat. No. 10,099,156 B2) describes a protein capture mode by sample feeding via two columns interconnected. Patent (US Patent 2012/0091063 A1) puts forward a three-column continuous chromatography, and use thereof in the separation of a mixture containing a monoclonal antibody and bovine serum albumin. Patent (US Patent 2017/0016864 A1) puts forward a multi-column continuous protein capture mode, comprising in-series sample feeding of a twin-column and a three-column chromatography, and experiment optimization to the process.

In general, the multi-column continuous chromatography has a complex process, more optional operation parameters and heavy workload of experiment optimization. If a mathematical model can be used for rational process characterization and design, the process design and optimization efficiency can be improved, while trails and errors can be decreased. The existing mathematical methods may perform fitting and prediction of a breakthrough curve of chromatography experiments, such as Baur Daniel et al. (Biotechnol. J, 2016, 11:920-931) has performed fitting on an experimental breakthrough curve in combination with General Rate Model and Shrinking Core model to obtain mechanistic parameters, and then predicted a breakthrough curve at different flow rates and concentrations, thereby assisting chromatography process optimization and design. However, the chromatography models and continuous chromatography models used in the above patents and papers have relatively limited functions, and lack comprehensive calculation, comparison and optimization for different continuous chromatography modes and different operation conditions; therefore, there are many limitations in practical use. Further, to solve partial differential equations will take a long time; the higher the accuracy requirement is, the longer the required calculation time is. Therefore, it is against to a wide range of multi-parameter optimization and rapid design and analysis of the process.

Artificial neural network system has emerged in the 1940s, and is formed by connecting numerous adjustable link weight neurons, and has the abilities, such as large-scale parallel processing, distributed information storage, self-organization and self-learning. At present, artificial neural network is used for the process analysis of chromatographic separation, and has developed into network prediction based on a mechanistic model from a simple mode recognition, such as patent (U.S. Pat. No. 5,121,443; EP0395481A2) has reported that a neural network is used to remove noise interference, identify, split and overlay chromatography peaks, and characterize each property (residence time, peak width, and the like) of the chromatography peak. Du et al. (J. Chromatogr. A, 2007, 1145: 165-174) has put forward that an artificial neural network may be used to predict a breakthrough curve of protein adsorption. Wang et al. (J. Chromatogr. A, 2017, 1487: 211-217) has put forward that mechanistic model parameters may be substituted into a mechanistic model to produce a training set, and a neural network is trained to replace the mechanistic model with complex calculation process, and the ion-exchange chromatography peak can be fitted. The neural network used in the above patent and paper has a simple structure and relatively limited functions and thus, has lots of limitations in practical use. Moreover, it is difficult to satisfy the requirements of complex process design and large-scale parameter optimization. In view of the complexity of the continuous chromatography process, the selection of training dataset needs to be re-planned, thus satisfying the demands for process design and analysis.

SUMMARY

In consideration of the above existing technical problem, one aspect of the present invention is used to provide a method for realizing multi-column continuous chromatography design and analysis based on a chromatography model, which is aimed at performing fitting and accurate prediction on the breakthrough curve obtained by experiments, and analyzing the influences thereof on process productivity and resin capacity utilization based on multiple control parameters in the continuous chromatography, and making combinations with a chromatography mechanistic model and a continuous chromatography model under multiple operating modes to form an efficient and integrated system model, thus to assist the process analysis and optimization design of the multi-column continuous chromatography.

Another aspect of the present invention is used to provide a method for realizing multi-column continuous chromatography design and analysis based on an artificial neural network, which is aimed at performing fast fitting and prediction on the breakthrough curve obtained by experiments, and analyzing the influences thereof on process productivity and resin capacity utilization based on multiple control parameters in the continuous chromatography, and making combinations with the advantages of a mechanistic model and an artificial neural network to form an efficient and integrated system model, thus to assist the process analysis and optimization design of the multi-column continuous chromatography.

To achieve the above technical problem, the present invention adopts the following technical solution in one aspect:

A method for realizing multi-column continuous chromatography design and analysis based on a chromatography model includes the following steps:
  step 101, breakthrough curve fitting: substituting experimental operation parameters into a chromatography mechanistic model, and fitting a breakthrough curve obtained by experiments to obtain mechanistic model parameters;
  step 102, breakthrough curve prediction: defining a chromatography operating range, and substituting the mechanistic model parameters obtained in the step 101 and chromatography operation parameters into the chromatography mechanistic model to obtain one-column and twin-column in-series breakthrough curves at different flow rates and different protein concentrations.
  step 103, process analysis of continuous chromatography: substituting the breakthrough curves predicted in the step 102 and the basic continuous chromatography operation parameters into a continuous chromatography model to obtain design parameters and evaluation factors of the continuous chromatography process; and analyzing influences of the operation parameters variation on performance indexes such as process productivity and resin capacity utilization of the multi-column continuous chromatography;
  and step 104, operation space optimization of continuous chromatography: determining a suitable process productivity and resin capacity utilization based on a specific separation target and requirements, and obtaining an operation space of the optimized design parameters of continuous chromatography via the analysis in the step 103.

Preferably, the breakthrough curve fitting in the step 101 further includes the following steps:
  substituting the experimental operation parameters and an initial value of feature model parameters into the chromatography mechanistic model to calculate a breakthrough curve, and comparing the calculated result with the breakthrough curve obtained by experiments; and changing the chromatography model parameters to minimize a root mean square error (RMSD) thereof to obtain chromatography model parameters.

Preferably, the breakthrough curve prediction in the step 102 further includes the following steps:
  setting a flow rate of chromatography operation and a protein concentration range, and generating a chromatography operation parameter matrix within the range and merging with the chromatography model parameters obtained in the step 101, and substituting into the chromatography model for calculation, and performing predicting to obtain the one-column and twin-column in-series breakthrough curves at different flow rates and different protein concentrations.

Preferably, the process analysis of the continuous chromatography includes the following steps:
  substituting the predicted breakthrough curve and the basic operation parameters of the continuous chromatography into the continuous chromatography model to obtain process design parameters and a process scheduling of the continuous chromatography;
  substituting the obtained process design parameters and the process scheduling of the continuous chromatography into an evaluation model of continuous chromatography, and performing calculating to obtain a process productivity and a rein capacity utilization of the multi-column continuous chromatography.

Preferably, the operation space of the continuous chromatography includes the following steps:
  generating a parameter matrix based on a design parameter range of continuous chromatography, calculating process productivities for all the parameter points within the matrix to obtain a process productivity matrix; and performing linear interpolation on the matrix and drawing a process productivity contour diagram under different operation conditions for the process analysis and optimization of continuous chromatography;
  generating a parameter matrix based on a design parameter range of continuous chromatography, calculating resin capacity utilization to all the parameter points within the matrix to obtain a resin capacity utilization matrix; and performing linear interpolation on the matrix and drawing a resin capacity utilization contour diagram under different operation conditions for the process analysis and optimization of continuous chromatography;
  calculating design parameter ranges of continuous chromatography satisfying the separation target respectively in the process productivity contour diagram and in the resin capacity utilization contour diagram based on a specific separation target, and performing superposition on design parameter regions of the two diagrams to obtain design parameters of continuous chromatography satisfying the requirements of process productivity and resin capacity utilization simultaneously, and calculating operation parameters and process scheduling of the continuous chromatography process.

Preferably, the chromatography mechanistic model is a General Rate Model considering parallel diffusion.

Preferably, the method for realizing multi-column continuous chromatography design and analysis based on a chromatography mechanistic model is characterized in that the continuous chromatography model is a continuous chromatography design model established according to different operating modes; evaluation parameters of continuous chromatography mainly comprise process productivity and resin capacity utilization, wherein the different operating modes comprise twin-column, three-column, four-column, and N-column (N>4).

The method for realizing multi-column continuous chromatography design and analysis based on a chromatography mechanistic model achieved above has the following beneficial effects:
  (1) a general chromatography model is taken for fitting limited data of experimental breakthrough curves to obtain a breakthrough curve with model parameters at different flow rates and different protein concentrations; breakthrough curves are predicted through a wide range of chromatography operation parameter variation based on a small amount of experimental data, thus improving the efficiency and reliability of the optimization process;

(2) respective process operation parameters and design parameters are obtained for different modes of continuous chromatography processes, including twin-column, three-column, four-column, and N-column (N>4), which can achieve the comprehensive analysis and comparison of different multi-column continuous chromatography modes, thereby systematically evaluating different multi-column continuous chromatography modes and optimizing the separation performance of multi-column continuous chromatography;

(3) influences of operation parameter and design parameter variation on the separation performance of continuous chromatography are analyzed on the basis of the prediction function of the chromatography model to obtain a process productivity contour diagram and a resin capacity utilization contour diagram, thereby reasonably designing the operation space of the continuous chromatography and significantly improving the process development efficiency of multi-column continuous chromatography.

The present invention adopts the following technical solution in one aspect:

A method for realizing multi-column continuous chromatography design and analysis based on an artificial neural network includes the following steps:

step 201, first artificial neural network training: establishing a chromatography breakthrough curve dataset and a mechanistic model parameter set by adopting a mechanistic model and an experimental method; serving the breakthrough curve dataset as an input and serving the mechanistic model parameter set as an output, performing training to obtain the first artificial neural network;

step 202, second artificial neural network training: establishing a chromatography breakthrough curve dataset and a mechanistic model parameter set by adopting a mechanistic model and an experimental method; serving the mechanistic model parameter set as an input and serving the breakthrough curve dataset as an output, and performing training to obtain the second artificial neural network;

step 203, breakthrough curve fitting: performing linear interpolation on the breakthrough curve obtained by experiments to obtain feature points of the breakthrough curve; serving the feature points and experimental operation parameters as an input to be substituted into the first artificial neural network, performing fitting and calculating to obtain mechanistic model parameters;

step 204, breakthrough curve prediction: substituting the mechanistic model parameters obtained in the step 203 into the second artificial neural network; obtaining a breakthrough curve at different flow rates and different protein concentrations based on a chromatography parameter prediction range, and performing comparing with experimental data of the breakthrough curve; wherein, if an error is greater than 5%, the first artificial neural network training and the second artificial neural network training will be re-performed, and the step 203 and the step 204 will be re-performed.

step 205, process analysis of continuous chromatography: substituting the breakthrough curve predicted in the step 204 and the basic continuous chromatography operation parameters into a continuous chromatography model to obtain design parameters and evaluation factors of the continuous chromatography process; and analyzing influences of the continuous chromatography operation parameters variation on performance indexes such as process productivity and resin capacity utilization of the multi-column continuous chromatography;

and step 206, operation space optimization of the continuous chromatography: determining a suitable process productivity and resin capacity utilization based on a specific separation target and requirements, and obtaining an operation space of the optimized continuous chromatography via the analysis in the step 205.

Preferably, the first artificial neural network training in the step 201 and the breakthrough curve fitting in the step 203 further comprise the following steps:

generating several chromatography mechanistic model parameter sets randomly distributed within a certain range and substituting the chromatography mechanistic model parameter sets into mechanistic model equations; generating a breakthrough curve dataset by an orthogonal collocation method, or obtaining a breakthrough curve dataset corresponding to the mechanistic model parameters by experiments;

performing extraction and normalization processing on the feature points of the breakthrough curve to determine the number of neuron nodes and number of network layers; using the breakthrough curve feature points and mechanistic model parameters respectively as an input set and an output set, and training an artificial neural network and denoting the artificial neural network as the first artificial neural network;

performing linear interpolation on the breakthrough curve data obtained by experiments to obtain breakthrough curve feature points, and substituting the breakthrough curve feature points into the trained first artificial neural network for calculation, thus obtaining the model parameters in the mechanistic model.

Preferably, the second artificial neural network training in the step 202 and the breakthrough curve fitting in the step 204 further include the following steps:

generating several chromatography mechanistic model parameter sets randomly distributed within a certain range and substituting the chromatography mechanistic model parameter sets into mechanistic model equations; generating a breakthrough curve dataset by an orthogonal collocation method, or obtaining a breakthrough curve dataset corresponding to the mechanistic model parameters by experiments;

performing extraction and normalization processing on the feature points of the breakthrough curve to determine the number of neuron nodes and number of network layers; using the mechanistic model parameters and the breakthrough curve feature points respectively as an input set and an output set, and training a neural network and denoting the neural network as the second artificial neural network;

generating a chromatography operation parameter matrix within a certain residence time and protein concentration range, and merging with the mechanistic model parameters, and substituting into the trained second artificial neural network for calculation, thus performing predicting to obtain a breakthrough curve under different chromatography operation conditions.

Preferably, the process of re-performing the first artificial neural network training and the second artificial neural network training in the step 204 is as follows:

fitting the experimental breakthrough curve by a mechanistic model to obtain mechanistic model parameters under the experimental condition; randomly generating a new mechanistic model parameter set within a range of the mechanistic model parameters ±30% and substituting the model parameter set into the mechanistic model to obtain a new breakthrough curve set; merging the new breakthrough curve dataset into the original breakthrough curve database, and respectively re-performing the first artificial neural network training and the second artificial neural network training.

Preferably, the process analysis of the continuous chromatography includes the following steps:
  substituting the predicted breakthrough curve feature points and the basic operation parameters of the continuous chromatography into the continuous chromatography model to obtain design parameters and a process scheduling of the continuous chromatography process;
  evaluation parameter calculation step: substituting the obtained process design parameters and process scheduling of the continuous chromatography into an evaluation model of the continuous chromatography, and performing calculating to obtain a process productivity and a resin capacity utilization of the multi-column continuous chromatography.

Preferably, the operation space optimization of the continuous chromatography includes the following steps:
  generating a parameter matrix based on a design parameter range of the continuous chromatography, calculating process productivities for all the parameter points within the matrix to obtain a process productivity matrix; and performing linear interpolation on the matrix and drawing a process productivity contour diagram under different operation conditions for the process analysis and optimization of the continuous chromatography;
  generating a parameter matrix based on a design parameter range of the continuous chromatography, calculating resin capacity utilization to all the parameter points within the matrix to obtain a resin capacity utilization matrix; and performing linear interpolation on the matrix and drawing a resin capacity utilization contour diagram under different operation conditions for the process analysis and optimization of the continuous chromatography;
  calculating a continuous chromatography design parameter range satisfying the separation target respectively in the process productivity contour diagram and in the resin capacity utilization contour diagram based on a specific separation target, and performing superposition on design parameter regions of the two diagrams to obtain continuous chromatography design parameters satisfying the requirements of process productivity and resin capacity utilization simultaneously, and calculating operation parameters and a process scheduling of the continuous chromatography process.

Preferably, the chromatography mechanistic model is a General Rate Model taking parallel diffusion into consideration.

Preferably, the continuous chromatography model is a continuous chromatography design model established according to different operating modes; evaluation parameters of the continuous chromatography mainly include process productivity and resin capacity utilization, where the different operating modes include twin-column, three-column, four-column, and N-column (N>4).

The method for realizing multi-column continuous chromatography design and analysis based on an artificial neural network achieved above has the following beneficial effects:
(1) a general chromatography mechanistic model is used to generate a training set and a prediction set of the artificial neural network, thus greatly decreasing the experimental workload and increasing the reliability of artificial neural network;
(2) artificial neural network is used to replace a mechanistic model for the fitting and prediction of a breakthrough curve, which quickens the calculation speed under the condition of keeping calculation accuracy and thus, is beneficial to a wide range of parameter analysis and optimization;
(3) the mutual nested way of mechanistic model and neural network is used for fitting and prediction, which decreases the training difficulty of neural network and increases the reliability of calculation results;
(4) the fitting effect can be self-detected during the use, and once a high error is found, the mechanistic model is used to generate a new training set, then neural network is retrained to form an intelligent self-learning system;
(5) respective process operation parameters and design parameters are obtained for different modes of continuous chromatography processes, including twin-column, three-column, four-column, and N-column (N>4), which can achieve the comprehensive analysis of different multi-column continuous chromatography modes; and
(6) influences of a variation of multiple operation parameters and design parameters on the separation performance of continuous chromatography are analyzed systematically on the basis of the computing power of neural network to obtain a process productivity contour diagram and a resin capacity utilization contour diagram, thereby reasonably designing the operation optimization space of the continuous chromatography.

DETAILED DESCRIPTION OF THE EMBODIMENTS

The technical solutions in examples of the present invention will be clearly and integrally described in combination with the accompanying figures in the examples of the present invention. Apparently, the examples described herein are merely a portion of examples of the present invention instead of all the examples. Based on the examples in the present invention, all the other examples obtained by a person skilled in the art without any inventive effort shall fall within the protection scope of the present invention.

Figure 1:
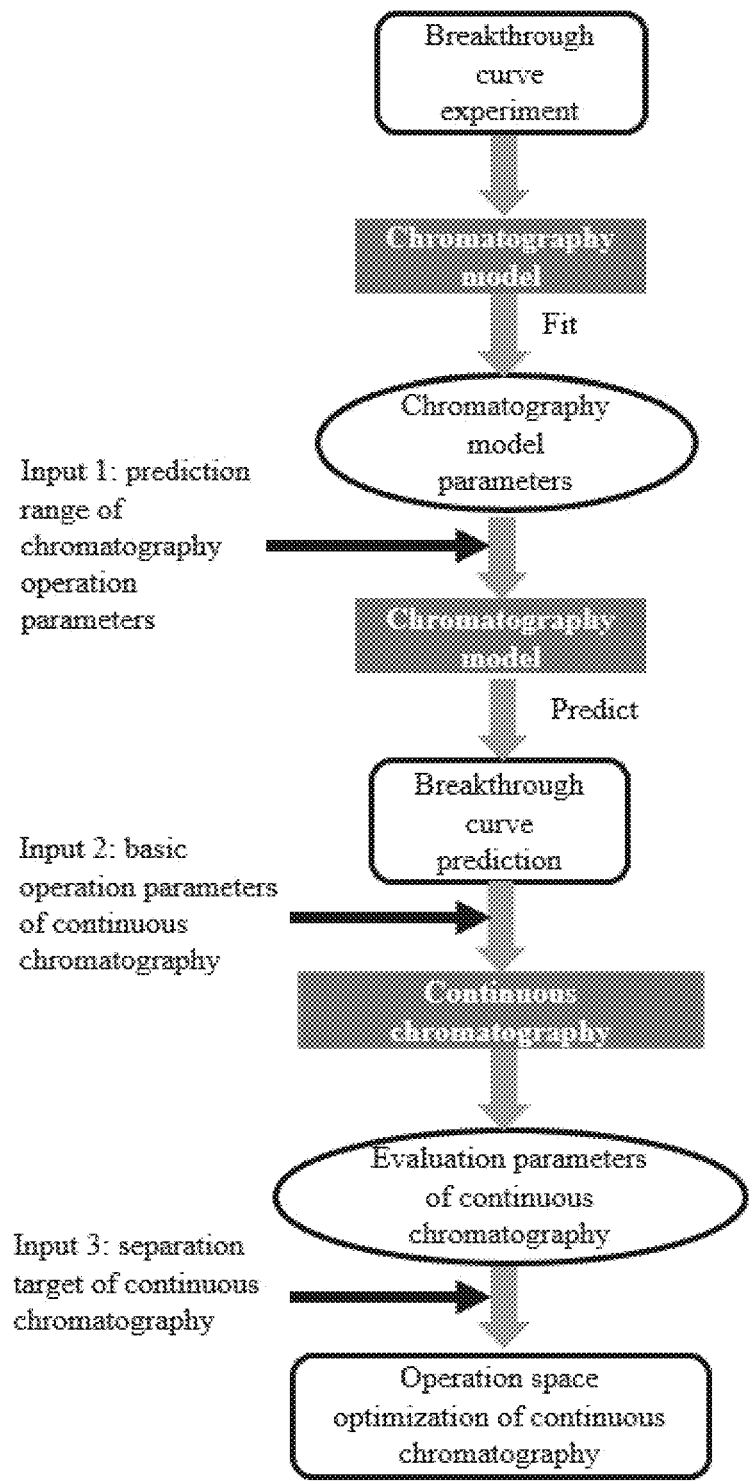
FIG. 1 is a schematic diagram showing steps of a method for realizing multi-column continuous chromatography design and analysis based on a chromatography mechanistic model in examples of the present invention.

By reference to FIG. 1, examples of the present invention disclose a method for realizing multi-column continuous chromatography design and analysis based on a chromatography model, specifically including the following steps:

step 101, experimental breakthrough curve fitting: substituting an experimental breakthrough curve and chromatography operation parameters into a chromatography model, and fitting the breakthrough curve to obtain chromatography model parameters;

step 102, breakthrough curve prediction: defining a chromatography operating range, and substituting the chromatography model parameters obtained in the step 101 and chromatography operation parameters into the chromatography model to obtain one-column and twin-column in-series breakthrough curves at different flow rates and different protein concentrations;

step 103, process analysis of continuous chromatography: substituting the breakthrough curves predicted in the step 102 and the basic continuous chromatography operation parameters into a continuous chromatography model to obtain design parameters and evaluation factors of the continuous chromatography process; and analyzing the influences of a variation of the continuous chromatography operation parameters on performance parameters such as a process productivity and a resin capacity utilization of the multi-column continuous chromatography;

and step 104, operation space optimization of the continuous chromatography: determining a suitable process productivity and resin capacity utilization based on a specific separation target and requirements, and obtaining an operation space of the optimized design parameters of continuous chromatography via the analysis in the step 103.

To understand the detailed implementation process of the examples of the present invention better, the specific implementation process of the above steps will be further described specifically.

In a specific application example, the chromatography mechanistic model is a General Rate Model taking parallel diffusion into consideration, and the equations areas follows:

$$\frac{\partial c}{\partial t} = D_{ax}\frac{\partial^2 c}{\partial x^2} - u\frac{\partial c}{\partial x} - \frac{1-\varepsilon}{\varepsilon}3k_f\frac{(c-c_p|_{r=r_p})}{r_p}$$

$$\varepsilon_p\frac{\partial c_p}{\partial t} + \frac{\partial q}{\partial t} = \frac{\varepsilon_p D_p}{r^2}\frac{\partial}{\partial r}\left(r^2\frac{\partial c_p}{\partial r}\right) + \frac{D_s}{r^2}\frac{\partial}{\partial r}\left(r^2\frac{\partial q}{\partial r}\right)$$

in which, c is a protein concentration within a chromatographic column with a unit of mg/mL; $c_p$ is a protein concentration within a resin particle with a unit of mg/mL; $c_0$ is a feeding protein concentration with a unit of mg/mL; t is time with a unit of s; $D_{ax}$ is an axial diffusion coefficient within the column with a unit of m²/s; x is an axial distance within the column with a unit of m; u is a superficial flow rate with a unit of mL/min; $\varepsilon$ is a voidage within the column; $\varepsilon_p$ is a porosity within the particle; $k_f$ is a liquid-film mass transfer coefficient with a unit of m/s; r is a radial distance within the particle with a unit of m; $r_p$ is a particle radius with a unit of m; q is a solid-phase protein concentration with a unit of mg/mL; $D_p$ is a liquid-phase diffusion coefficient within the particle with a unit of m²/s; $D_s$ is a solid-phase diffusion coefficient within the particle with a unit of m²/s; and L is a column length with a unit of m.

Boundary conditions of the above equation are as follows:

$$\text{when } t = 0, c = 0 \text{ and } c_p = 0;$$

$$\text{when } x = 0, c = c_0 + \frac{\varepsilon D_{ax}}{u}\frac{\partial c}{\partial x};$$

$$\text{when } x = L, \frac{\partial c}{\partial x} = 0;$$

$$\text{when } x = 0, \frac{\partial c_p}{\partial r} = 0;$$

$$\text{when } r = r_p, D_e\frac{\partial c_p}{\partial r} = \frac{k_f}{\varepsilon_p}(c - c_p);$$

The used protein adsorption model is a Langmuir adsorption isotherm model with the following equation:

$$q = \frac{Q_{max}c_p}{k_d + c_p}$$

in which, $Q_{max}$ is a saturated adsorption capacity with a unit of mg/mL; and $k_d$ is an equilibrium desorption constant with a unit of mg/mL.

In specific application examples, for the selection of a continuous chromatography design model, different continuous chromatography design models are established according to different continuous chromatography operating modes such as, twin-column, three-column, four-column, and N-column (N>4), thereby obtaining process operation parameters and a process scheduling.

(1) In case of a twin-column continuous chromatography operating mode, the key operation parameters include feeding time under the interconnected mode and feeding flow rate under a disconnected mode, and the calculation method is as follows:

$$T_C = (\min(T_{1\_s}, T_{2\_1\%}) - T_{1\_1\%}) +$$

$$\frac{\left(T_{1\_1\%}c_0 - \sum_{t=T_{1\_1\%}}^{\min(T_{1\_s}, T_{2\_1\%})} c(t)\right)U_C - U_{DC}T_{DC}c_0}{c_0 U_C}$$

$$U_{DC} = \min\left(U_C, \frac{T_{1\_1\%}c_0 \cdot SF - \sum_{t=T_{1\_1\%}}^{\min(T_{1\_s\%}, T_{2\_1\%})} c(t)}{T_{DC}c_0}U_C\right)$$

in which, $T_C$ is a feeding time under the interconnected mode with a unit of min; $U_{DC}$ represents a feeding flow rate under a disconnected mode with a unit of mL/min; $C_0$ is a protein feeding concentration with a unit of mg; $T_Dc$ is a feeding time under the disconnected mode with a unit of min; $U_C$ is a feeding flow rate under the interconnected mode with a unit of mL/min; $T_{1\_1\%}$ is a time point of 1% breakthrough of the one-column with a unit of min; $T_{1\_s\%}$ is a time point of s % breakthrough of the twin-column with a unit of min; $T_{2\_1\%}$ is a time point of 1% breakthrough of the twin-column with a unit of min; and SF is a safety factor.

(2) In case of a three-column continuous chromatography operating mode, the key operation parameters include feeding time and waiting time under the interconnected mode, and the calculation method is as follows:

$$T_C = \min(T_{1\_s}, T_{2\_1\%}) - \sum_{t=T_{1\_1\%}}^{\min(T_{1\_s}, T_{2\_1\%})} c(t)/c_0 - T_{CW}$$

$$T_{wait} = T_C - T_{RR} \text{ if } T_C > T_{RR}$$

$$T_{wait} = 2(T_{RR} - T_C) \text{ if } T_{RR} > T_C$$

in which, $T_{CW}$ represents a cleaning time under the interconnected mode with a unit of min; $T_{wait}$ is a waiting time with a unit of min; $T_{RR}$ is total time of elution, cleaning and regeneration with a unit of min.

(3) In case of a four-column continuous chromatography operating mode, the key operation parameters are referring to the feeding time and waiting time under the interconnected mode, where, the feeding time under the interconnected mode is the same as the calculation method of the three-column; and the calculation method of the waiting time is as follows:

$$T_{wait} = 2T_C - T + T_{CW} \text{ if } T_C > (T_{RR} - T_{CW})/2$$

$$T_{wait} = 2(T_{RR} - 2T_C - T_{CW}) \text{ if } (T_{RR} - T_{CW})/2 > T_C$$

(4) In case of a N (N>4)-column continuous chromatography operating mode, the key operation parameters include number of columns, feeding time and waiting time under the interconnected mode; where, the feeding time of the interconnected mode is the same as the calculation method of the three-column; and the number of columns and the calculation method of the waiting time are as follows:

$$N = \left\lceil \frac{T_{RR} + T_{CW}}{T_C + T_{CW}} \right\rceil + 2$$

$$T_{wait} = (N-2)T_C + (N-3)T_{CW} - T_{RR}$$

in which, the symbol ⌈ ⌉ is rounding up to an integer.

In specific application examples, for an evaluation model of the continuous chromatography, evaluation parameters mainly include process productivity and resin capacity utilization; and the calculation formula of the process productivity is as follows:

$$P_c = \frac{[T_C U_C + T_{DC} U_{DC}]c_0}{T_{cycle} CV} \times 60$$

in which, $P_C$ is process productivity of continuous chromatography with a unit of g/L/min; $U_C$ is a feeding flow rate under the interconnected mode with a unit of mL/min; $T_{DC}$ is a feeding time under a disconnected mode with a unit of mine; CV is a column volume with a unit of mL; $T_{cycle}$ is total time required by running a cycle and back to the initial state with a unit of min.

The calculation formula of the resin capacity utilization is as follows:

$$CU_c = \frac{[T_C U_C + T_{DC} U_{DC}]c_0}{\left(T_{1\_95\%}c_0 - \sum_{t=T_{1\_1\%}}^{T_{1\_95\%}} c(t)\right)U_C} \times 100\%$$

in which, CUC is resin capacity utilization of continuous chromatography with a unit of %; and $T_{1\_95\%}$ is a time point of 95% breakthrough of the one-column with a unit of min.

By the models and parameters set above, in the step 101, the experimental breakthrough curve fitting mainly includes the following steps:

(1) based on a chromatography model, model parameters include related mass transfer parameters (including axial diffusion coefficient, liquid-film mass transfer coefficient, solid-phase mass transfer coefficient within the particle, liquid-phase mass transfer coefficient within the particle, etc.), related adsorption parameters (including saturated adsorption capacity, equilibrium desorption constant, etc.), and related operation parameters (including a superficial flow rate and feeding concentration, etc.);

(2) substituting the related operation parameters of the breakthrough experiment, given initial values of related mass transfer parameters and related adsorption parameters into a chromatography mechanistic model, and calculating to obtain a corresponding breakthrough curve by an orthogonal collocation method;

(3) serving a root mean square error of the breakthrough curve obtained by model calculation and the breakthrough curve obtained by experiments as an objective function, and fitting the related adsorption parameters and related mass transfer parameters by an interior point method to obtain parameters when the objective function is up to minimum, namely, fitted chromatography model parameters.

In specific application examples, by the set parameters and model, in the step 102, the breakthrough curve prediction includes the following steps:

(1) one-column breakthrough curve prediction: setting a chromatography operation parameter range, and substituting the chromatography model parameters obtained in the step 101 and chromatography operation parameters into a chromatography model within the range to obtain a one-column breakthrough curve at different flow rates and different protein concentrations;

(2) twin-column in-series breakthrough curve prediction: setting a chromatography operation parameter range, and substituting the chromatography model parameters obtained in the step 101 and chromatography operation parameters into a chromatography model within the range, and serving the protein concentration changing with time in the breakthrough curve obtained from an output of the first column as a feeding concentration of the second column, thus obtaining a twin-column in-series breakthrough curve at different flow rates and different protein concentrations.

In specific application examples, the process analysis of the continuous chromatography in the step 103 includes the following steps:

(1) substituting the predicted breakthrough curve, basic operation parameters of the continuous chromatography (including the time of elution, cleaning and regeneration, column volume of washing under the interconnected mode, safety factor, etc.) and continuous chromatography design parameters (switching point, residence time, feeding protein concentration, etc.) into the above continuous chromatography model to obtain a process scheduling of the continuous chromatography process;

(2) evaluation parameter calculation step: substituting the design parameters and the process scheduling of the continuous chromatography obtained in the previous step into an evaluation model of the above continuous chromatography, and performing calculating to obtain a process productivity and a resin capacity utilization of the multi-column continuous chromatography.

In specific application examples, in the step 104, the operation space optimization of the continuous chromatography includes the following steps:

(1) process productivity contour diagram: generating a parameter matrix based on a design parameter range of the continuous chromatography, calculating process productivities for all the parameter points within the matrix according to the above method to obtain a process productivity matrix; and performing linear interpolation on the matrix and drawing a process productivity contour diagram under different operation conditions (including residence time, switching point and feeding protein concentration) for the process analysis and optimization of continuous chromatography;

(2) resin capacity utilization contour diagram: generating a parameter matrix based on a design parameter range of continuous chromatography, calculating resin capacity utilization for all the parameter points within the matrix according to the above method to obtain a resin capacity utilization matrix; and performing linear interpolation on the matrix and drawing a resin capacity utilization contour diagram under different operation conditions (including residence time, switching point and feeding protein concentration) for the process analysis and optimization of the continuous chromatography;

(3) parameter optimization of the continuous chromatography: calculating a continuous chromatography design parameter range satisfying the separation target respectively in the process productivity contour diagram and in the resin capacity utilization contour diagram based on a specific separation target (process productivity and resin capacity utilization), and performing superposition on design parameter regions of the two diagrams to obtain continuous chromatography design parameters satisfying the requirements of process productivity and resin capacity utilization simultaneously, and calculating operation parameters and a process scheduling of the continuous chromatography process.

Further, to make the technical effect of the examples of the present invention more apparent, the implementation process of the present invention will be described in combination with figures and graphic examples.

Example 1 Experimental Breakthrough Curve Fitting (1) Experimental Breakthrough Curve A resin Praesto Jetted A50 from Purolite Life Sciences was taken for a breakthrough experiment of IgG protein, where, the flow rate was 1 mL/min, feeding protein concentration was 2 mg/mL, and feeding was stopped after being up to 95% breakthrough concentration, and the total volume of the feeding protein was 90 column volumes, then an experimental breakthrough curve was obtained.

Example 2 Breakthrough Curve Fitting Process

The initial values of chromatography model parameters: axial diffusion coefficient is $3*10^{-7}$ m$^2$/s; liquid-film mass transfer coefficient is $18*10^{-6}$ m/s; solid-phase mass transfer coefficient within the particle is $4*10^{-13}$ m$^2$/s; liquid-phase mass transfer coefficient within the particle is $6*10^{-12}$ m$^2$/s; saturated adsorption capacity is 80 mg/mL; and equilibrium desorption constant is 0.2 mg/mL. Related experimental operation parameters: flow rate is 1 mL/min and feeding protein concentration is 2 mg/mL.

The initial values of model parameters and the related experimental operation parameters were substituted into a chromatography model to calculate a breakthrough curve by an orthogonal collocation method, and the breakthrough curve was compared with experimental breakthrough curve; then a RMSD of the two served as an objective function, and an interior point method was used to solve a minimum value of the objective function; after through 83 times of iteration, the minimum value of the objective function was up to 0.011, thus obtaining fitted model parameters as follows: axial diffusion coefficient is $0.7*10^{-7}$ m$^2$/s; liquid-film mass transfer coefficient is $34*10^{-6}$ m/s; solid-phase mass transfer coefficient within the particle is $0.6*10^{-13}$ m$^2$/s; liquid-phase mass transfer coefficient within the particle is $4.5*10^{-12}$ m$^2$/s; saturated adsorption capacity is 124 mg/mL; and equilibrium desorption constant is 0.13 mg/mL.

Figure 2:
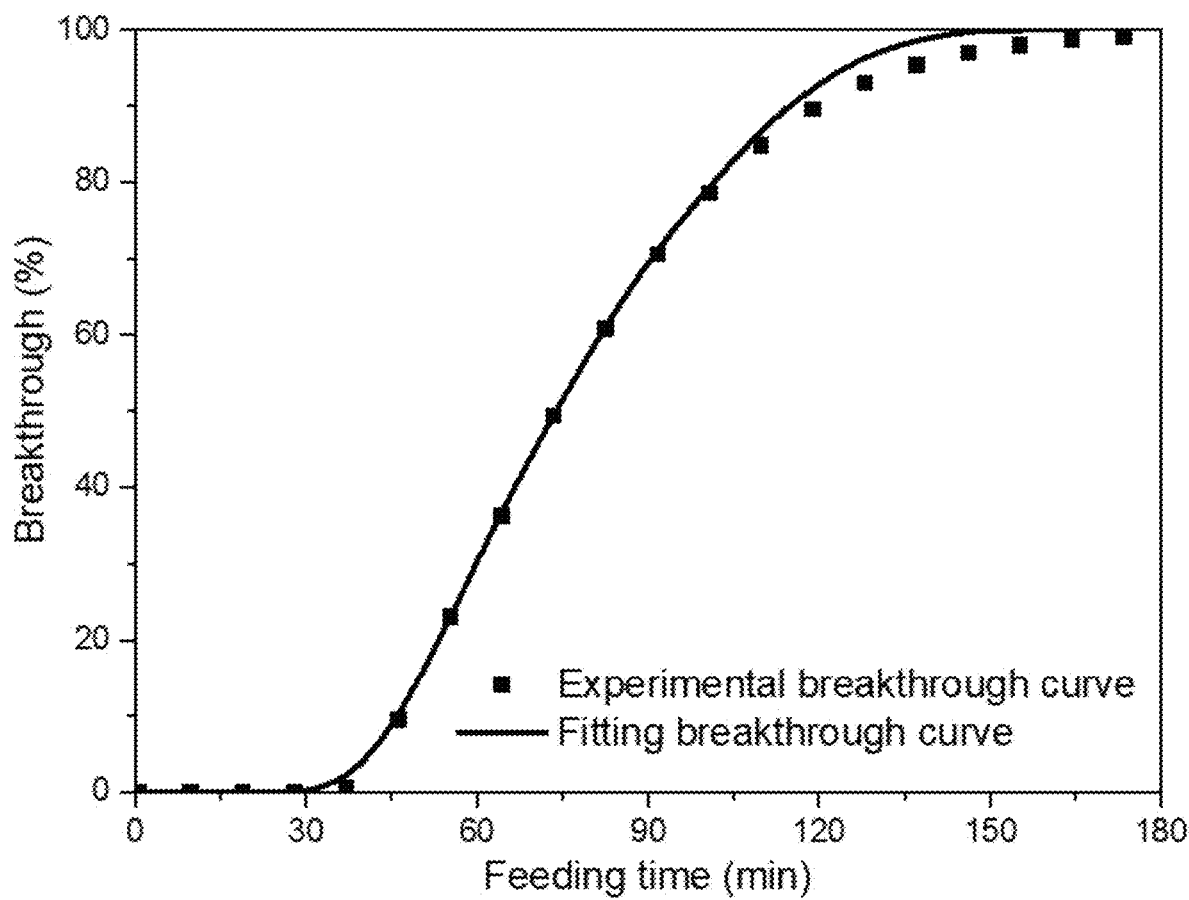
FIG. 2 shows a comparison between an experimental breakthrough curve and a model fitting breakthrough curve in Example 1 of the present invention.

FIG. 2 shows a comparison between an experimental breakthrough curve and a fitting breakthrough curve.

Example 2 Breakthrough Curve Prediction (1) One-Column Breakthrough Curve Prediction The chromatography model parameters obtained by fitting the breakthrough curve of Praesto Jetted A50 resin in Example 1 was used: axial diffusion coefficient was $0.7*10^{-7}$ m$^2$/s; liquid-film mass transfer coefficient was $34*10^{-6}$ m/s; solid-phase mass transfer coefficient within the particle was $0.6*10^{-13}$ m$^2$/s; liquid-phase mass transfer coefficient within the particle was $4.5*10^{-12}$ m$^2$/s; saturated adsorption capacity was 124 mg/mL; and equilibrium desorption constant was 0.13 mg/mL. Chromatography operation parameter range was set below: flow rate was 0.33 mL/min-3 mL/min and concentration was 0.5 mg/mL-5 mg/mL. The chromatography model parameters and operation parameters were substituted into a chromatography model within the range and calculated to obtain one-column breakthrough curves at different flow rates and different protein concentrations.

(2) Twin-Column In-Series Breakthrough Curve Prediction

Figure 3:
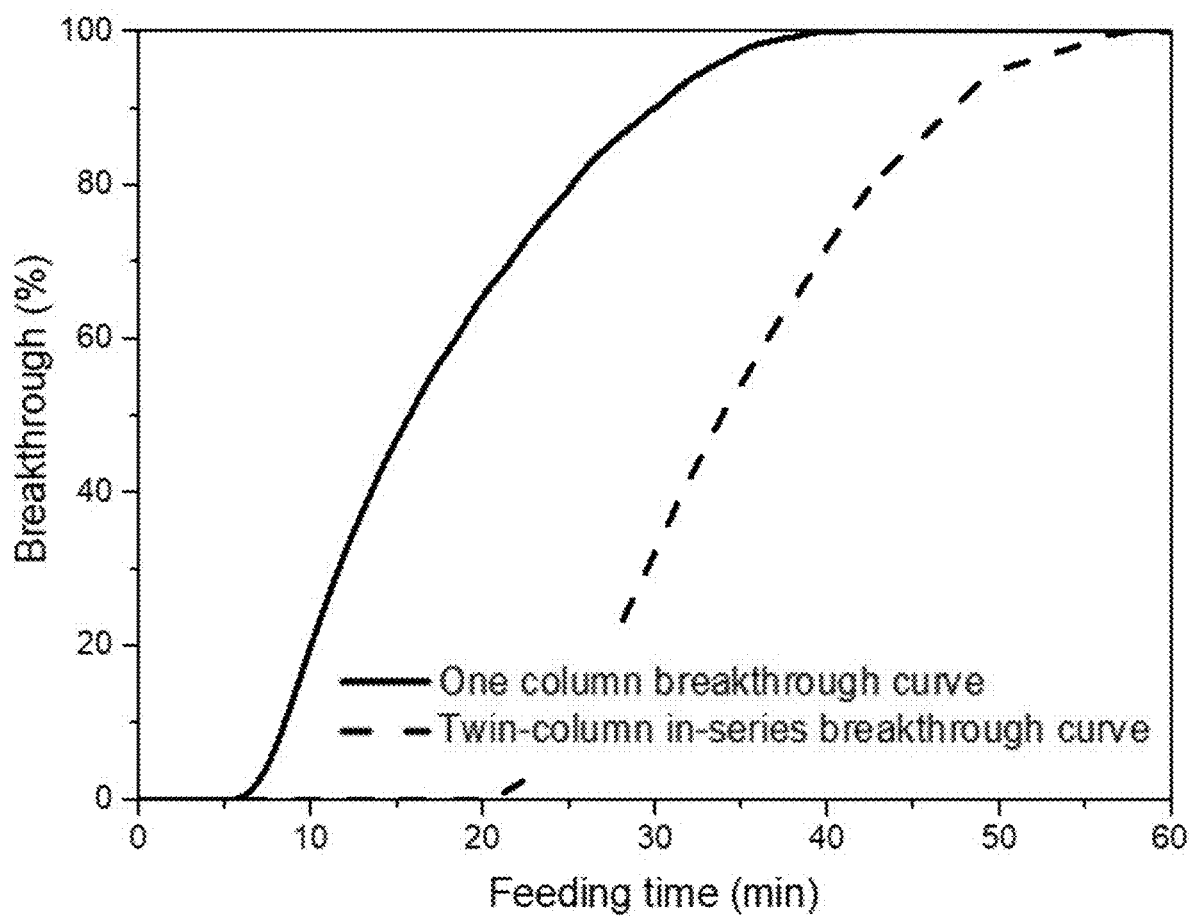
FIG. 3 is a schematic diagram showing two breakthrough curves in Example 2 of the present invention.

The protein concentration changing with time in the one-column breakthrough curve obtained in the above step (1) served as a feeding protein concentration of the second column; and chromatography model parameters and operation parameters the same as those in the one-column were substituted and calculated to obtain a twin-column breakthrough curve. For example, the predicted results of the one-column and twin-column breakthrough curves with a flow rate of 1.5 mL/min and a protein concentration of 3 mg/mL are shown in FIG. 3.

Example 3 Process Analysis and Operation Space Optimization of the Continuous Chromatography (1) Process Analysis of the Continuous Chromatography The breakthrough curves with Praesto Jetted A50 resin, protein concentration $C_0$ of 3 mg/mL and flow rate of 1.5 mL/min according to Example 1 was subjected to process analysis of the continuous chromatography. The design process is as follows:

Twin-column continuous chromatography design: the feeding flow rate $U_C$ under the interconnected mode was the same as that in the protein breakthrough experiment (1 mL/min); the feeding time $T_D c$ under the disconnected mode was the same as that in the total time $T_{RR}$ (26 min) of elution, cleaning and regeneration of the column; the washing column volume under the interconnected mode was 4 CV; and the washing flow rate under the interconnected mode was 1.5 mL/min, such that the washing time of $T_{CW}$=2.6 min under the interconnected mode could be obtained. Safety factor SF was set 0.9, switching point s was 80%; time $T_{1\_1\%}$ of the one-column of reaching 1% breakthrough was 6.5 min; time $T_{1\_s\ \%}$ of the one-column of reaching s breakthrough was 25.2 min; and time $T_{2\_1\%}$ of the twin-column of reaching 1% breakthrough was 21.5 min. The feeding flow rate $U_{DC}$ under the disconnected mode and the feeding time $T_C$ under the interconnected mode are solved by the following two equations:

$$U_{DC} = \min\left(U_C, \frac{T_{1\_1\%}c_0 \square SF - \sum_{t=T_{1\_1\%}}^{\min(T_{1\_s\%},T_{2\_1\%})} c(t)}{T_{DC}c_0}U_C\right) = 0.036 \text{ (mL/min)}$$

$$T_C = (\min(T_{1\_s}, T_{2\_1\%}) - T_{1\_1\%}) + \frac{\left(T_{1\_1\%}c_0 - \sum_{t=T_{1\_1\%}}^{\min(T_{1\_s},T_{2\_1\%})} c(t)\right)U_C - U_{DC}T_{DC}c_0}{c_0 U_C} = 17.5 \text{ (min)}$$

Three-column continuous chromatography design: values of the $T_{1\_1\%}$, $T_{1\_s\ \%}$, $T_{2\_1}\%$, $T_{CW}$ and $T_{RR}$ are the same as those above.

$T_C = \min(T_{1\_s}, T_{2\_1\%}) - \Sigma_{t=T_{1\_1\%}}^{\min(T_{1\_s},T_{2\_1\%})} c(t)/c_0 - T_{CW} 13.0$ (min)

Because $T_C < T_{RR}$, $T_{wait} = 2 \times (T_{RR} - T_C) = 26.0$ (min)

Four-column continuous chromatography design: values of the $T_C$, $T_{CW}$ and $T_{RR}$ are the same as those above.

$T_C$ is the same as the three-column continuous chromatography process.

Because $T_C > (T_{RR} - T_{CW})/2$, $T_{wait} = 2T_C - T_{RR} + T_{CW} = 2.6$ (min)

N-column continuous chromatography design: values of the $T_C$, $T_{CW}$ and $T_{RR}$ are the same as those above.

The formula $$N = \left\lceil \frac{T_{RR} + T_{CW}}{T_c + T_{CW}} \right\rceil + 2 = 4$$

indicates a four-column system suitable for continuous chromatography.

(2) Process Evaluation and Operation Space Optimization of the Continuous Chromatography The twin-column continuous chromatography was set as an example, and the above obtained operation parameters were substituted into the equations of process productivity and resin capacity utilization, where, time $T_{cycle}$ of the twin-column of running a cycle is 87.6 min; time $T_{1\_95\%}$ of the one-column of reaching 95% breakthrough is 33.2 min; and column volume CV is 1 mL. The following values may be obtained:

$$P_C = \frac{[T_C U_C + T_{DC} U_{DC}]c_0}{T_{cycle} CV} \times 60 = 48.6(g/L/h)$$

$$CU_C = \frac{[T_C U_C + T_{DC} U_{DC}]c_0}{\left(T_{1\_95\%}c_0 - \sum_{t=T_{1\_1\%}}^{T_{1\_95\%}} c(t)\right)U_C} \times 100\% = 89\%$$

Figure 4:
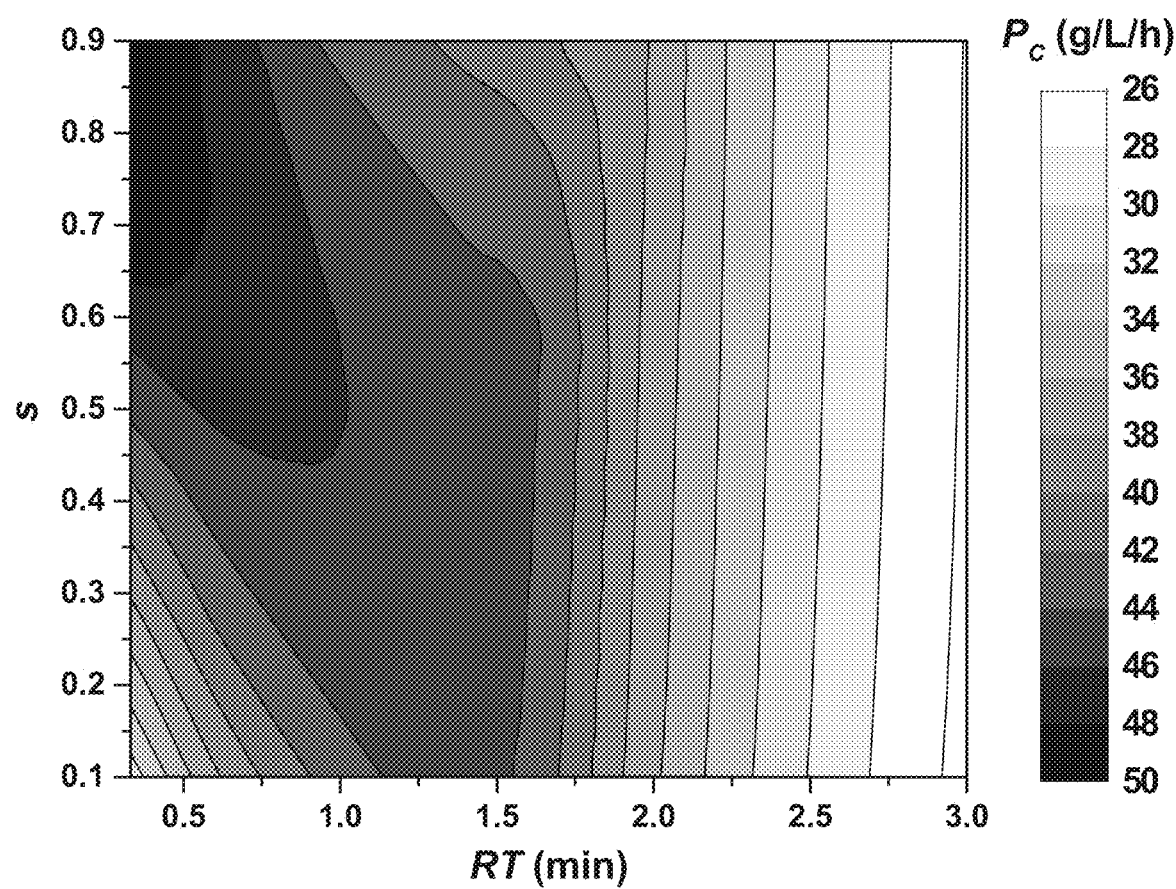
FIG. 4 shows a process productivity contour diagram of twin-column continuous chromatography in Example 3 of the present invention.
Figure 5:
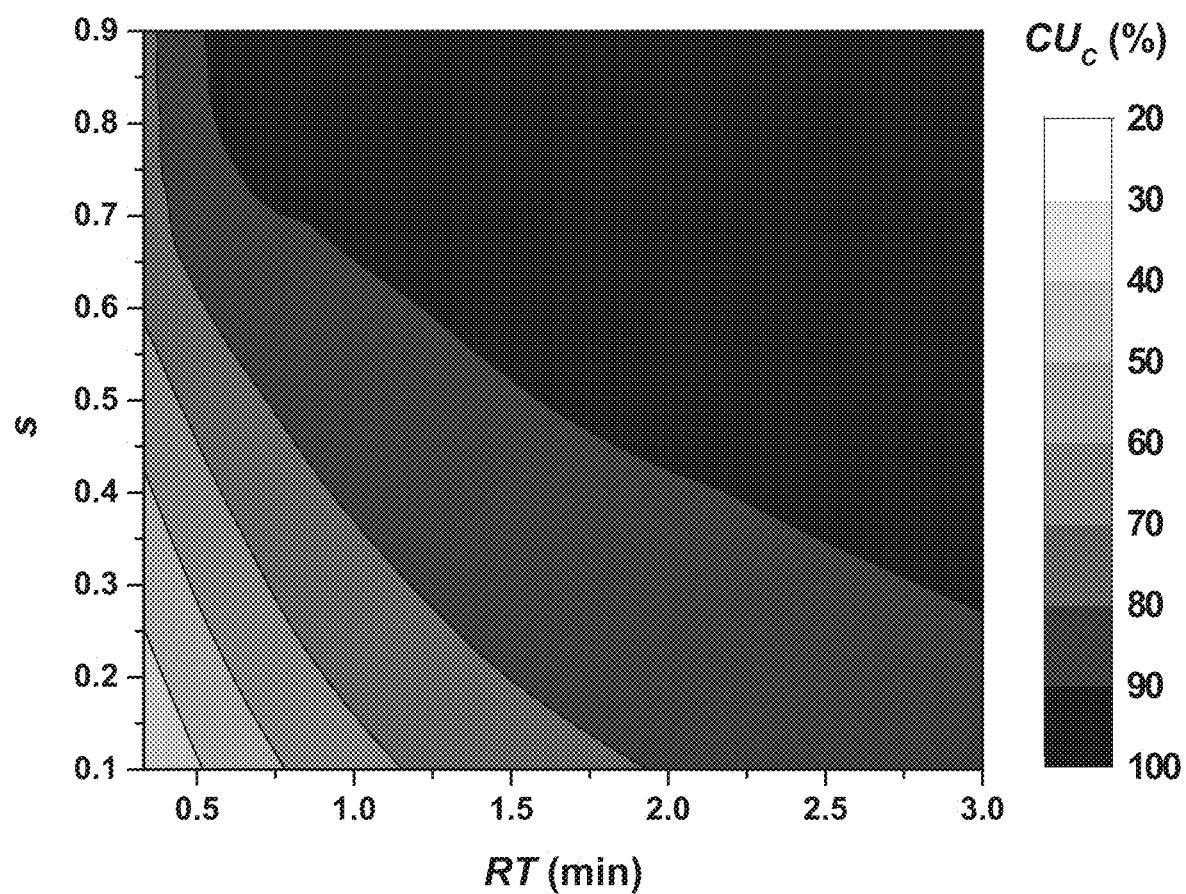
FIG. 5 shows a resin capacity utilization contour diagram of twin-column continuous chromatography in Example 3 of the present invention.

The different switching point parameters (0.1, 0.2, . . . , 0.9) and different residence time parameters (0.33, 0.5, 1, 1.5, 2, 2.5 and 3 min) were substituted into the above twin-column continuous chromatography design and evaluation equation, thus obtaining a process productivity matrix and a resin capacity utilization matrix of the twin-column continuous chromatography process. The matrixes were subjected to linear interpolation to obtain a process productivity contour diagram and a resin capacity utilization contour diagram, as shown in FIGS. 4-5.

Figure 6:
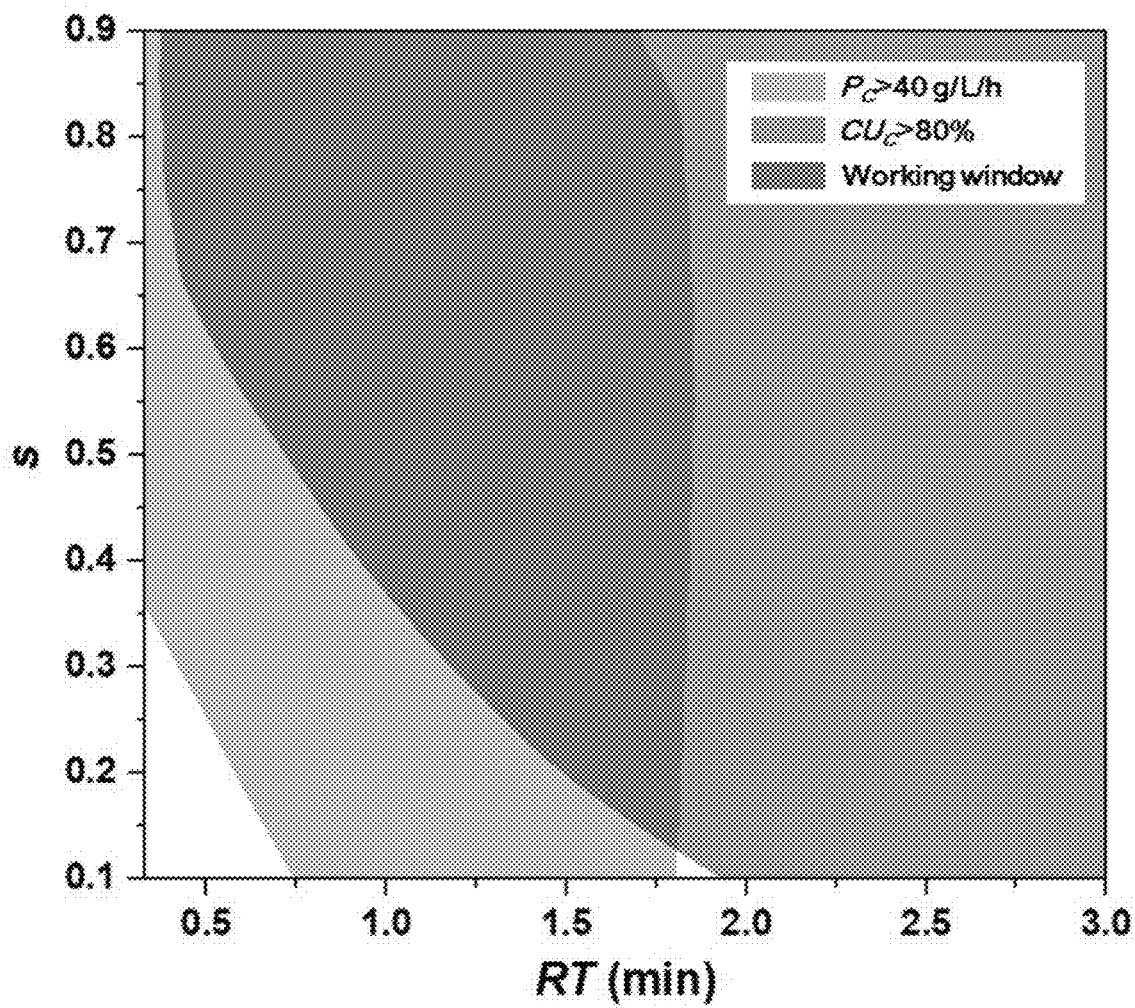
FIG. 6 is a schematic diagram showing an operation space of the continuous chromatography obtained according to a separation target in Example 3 of the present invention.

When a separation target was set, and if the process productivity was higher than 40 g/L/h and the resin capacity utilization was higher than 80%, an intersection with a process productivity higher than 40 g/L/h and a resin capacity utilization higher than 80% could be obtained in the above two contour charts according to the separation target, namely, a suitable operation space, as shown in FIG. 6.

The description of the above examples is used to specifically describe the implementation procedure of the method for realizing multi-column continuous chromatography design and analysis based on chromatography model. Then, the implementation process of the method for realizing multi-column continuous chromatography design and analysis based on an artificial neural network will be described specifically.

Figure 7:
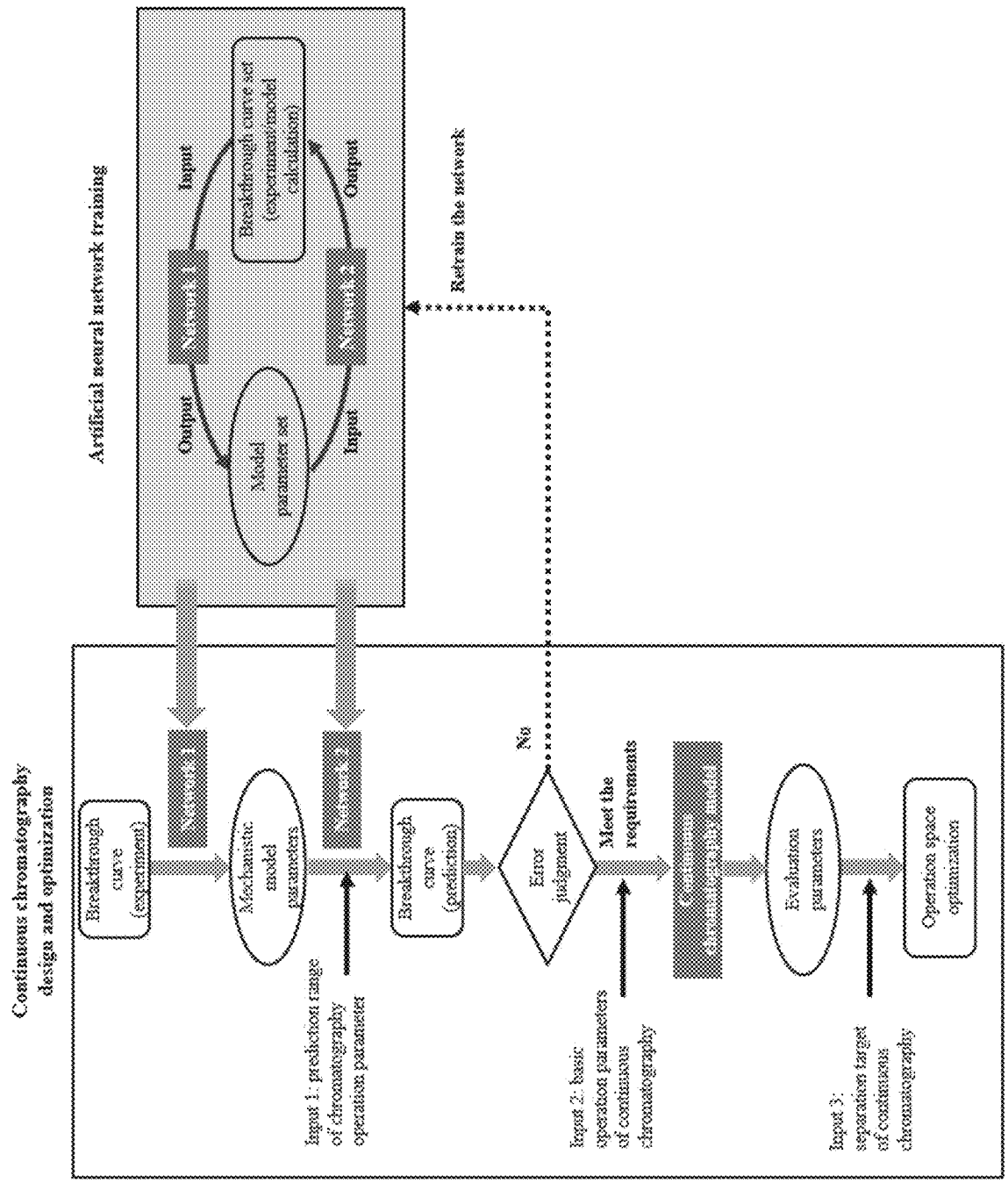
FIG. 7 is a schematic diagram showing steps of a method for realizing multi-column continuous chromatography design and analysis based on an artificial neural network in examples of the present invention.

By reference to FIG. 7, examples of the present invention disclose a method for realizing multi-column continuous chromatography design and analysis based on an artificial neural network, specifically including the following steps:

step 201, first artificial neural network training: used for establishing a chromatography breakthrough curve dataset and a mechanistic model parameter set by adopting a mechanistic model and an experimental method; serving the breakthrough curve dataset as an input and serving the mechanistic model parameter set as an output, and performing training to obtain the first artificial network;

step 202, second artificial neural network training: used for establishing a chromatography breakthrough curve dataset and a mechanistic model parameter set by adopting a mechanistic model and an experimental method; serving the mechanistic model parameter set as an input and serving the breakthrough curve dataset as an output, and performing training to obtain the second artificial neural network;

step 203, breakthrough curve fitting: used for performing linear interpolation on the breakthrough curve obtained by experiments to obtain feature points of the breakthrough curve; serving the feature points and experimental operation parameters as an input to be substituted into the first artificial neural network, performing fitting and calculating to obtain mechanistic model parameters;

step 204, breakthrough curve prediction: used for substituting the mechanistic model parameters obtained in the step 203 into the second artificial neural network; obtaining a breakthrough curve at different flow rates and different protein concentrations based on a chromatography parameter prediction range, and performing comparing with experimental data of the breakthrough curve; where, if an error is greater than 5%, the first artificial neural network training and the second artificial neural network training will be re-performed, and the step 203 and the step 204 will be re-performed;

step 205, process analysis of continuous chromatography: used for substituting the breakthrough curve predicted in the step 204 and the basic continuous chromatography operation parameters into a continuous chromatography model to obtain design parameters and evaluation factors of the continuous chromatography process; and analyzing influences of a variation of the continuous chromatography operation parameters on performance indexes such as process productivity and resin capacity utilization of the multi-column continuous chromatography;

and step 206, operation space optimization of the continuous chromatography: used for determining a suitable process productivity and resin capacity utilization based on a specific separation target and requirements, and obtaining an operation space of the optimized continuous chromatography design parameters via the analysis in the step 205.

To understand the detailed implementation process of the examples of the present invention better, the specific implementation process of the above steps will be further described specifically.

In a specific application example, the chromatography mechanistic model is a General Rate Model taking parallel diffusion into consideration, and the equations are as follows:

$$\partial c/\partial t = D_{ax}\partial^2 c/\partial x^2 - u\partial c/\partial x - 1 - \varepsilon/\varepsilon 3k_f(c-c_p|_{r=r_p})$$

$$\varepsilon_p \partial c_p/\partial t + \partial c/\partial t = \varepsilon_p D_p/r^2 \partial/\partial r(r^2 \partial c_p/\partial r) + D_s/r^2 \partial/\partial r(r^2 \partial q/\partial r)$$

in which, c is a protein concentration within a chromatographic column with a unit of mg/mL; $c_p$ is a protein concentration within a resin particle with a unit of mg/mL; $c_0$ is a feeding protein concentration with a unit of mg/mL; t is time with a unit of s; $D_{ax}$ is an axial diffusion coefficient within the column with a unit of m²/s; x is an axial distance within the column with a unit of m; u is a superficial flow rate with a unit of mL/min; $\varepsilon$ is a voidage within the column; $\varepsilon_p$ is a porosity within the particle; $k_f$ is a liquid-film mass transfer coefficient with a unit of m/s; r is a radial distance within the particle with a unit of m; $r_p$ is a particle radius with a unit of m; q is a solid-phase protein concentration with a unit of mg/mL; $D_p$ is a liquid-phase diffusion coefficient within the particle with a unit of m²/s; $D_s$ is a solid-phase diffusion coefficient within the particle with a unit of m²/s; and L is a column length with a unit of m.

Boundary conditions of the above equations are as follows:

$$\text{when } t = 0, c = 0, \text{ and } c_p = 0;$$

$$\text{when } x = 0, c = c_0 + \frac{\varepsilon D_{ax}}{u}\frac{\partial c}{\partial x};$$

$$\text{when } x = L, \frac{\partial c}{\partial x} = 0;$$

$$\text{when } x = 0, \frac{\partial c_p}{\partial r} = 0;$$

$$\text{when } r = r_p, D_e\frac{\partial c_p}{\partial r} = \frac{k_f}{\varepsilon_p}(c - c_p);$$

The used protein adsorption model is a Langmuir adsorption isotherm model with the following equation:

$$q = \frac{Q_{max}c_p}{k_d + c_p}$$

in which, $Q_{max}$ is a saturated adsorption capacity with a unit of mg/mL; and $k_d$ is an equilibrium desorption constant with a unit of mg/mL.

In specific application examples, for the selection of a continuous chromatography design model, different continuous chromatography design models are established according to different continuous chromatography operating modes such as, twin-column, three-column, four-column, and N-column (N>4), thereby obtaining process operation parameters and a process scheduling.

(1) In case of a twin-column continuous chromatography operating mode, the key operation parameters include feeding time of the interconnected mode and feeding flow rate of a disconnected mode, and the calculation method is as follows:

$$T_C = (\min(T_{1\_s}, T_{2\_1\%}) - T_{1\_1\%}) + \frac{\left(T_{1\_1\%}c_0 - \sum_{k=T_{1\_1\%}}^{\min(T_{1\_s},T_{2\_1\%})} c(t)\right)U_C - U_{DC}T_{DC}c_0}{c_0 U_C}$$

$$U_{DC} = \min\left(U_C, \frac{T_{1\_1\%}c_0 \square SF - \sum_{k=T_{1\_1\%}}^{\min(T_{1\_s\%},T_{2\_1\%})} c(t)}{T_{DC}c_0}U_C\right)$$

in which, $T_C$ is a feeding time under the interconnected mode with a unit of min; $U_{DC}$ represents a feeding flow rate under a disconnected mode with a unit of mL/min; $C_0$ is a protein feeding concentration with a unit of mg; $T_{DC}$ is feeding time under the disconnected mode with a unit of min; $U_C$ is a feeding flow rate under the interconnected mode with a unit of mL/min; $T_{1\_1\%}$ is a time point of 1% breakthrough of the one-column with a unit of min; $T_{1\_s\%}$ is a time point of s % breakthrough of the twin-column with a unit of min; $T_{2\_1\%}$ is a time point of 1% breakthrough of the twin-column with a unit of min; and SF is a safety factor.

(2) In case of a three-column continuous chromatography operating mode, the key operation parameters include feeding time and waiting time under the interconnected mode, and the calculation method is as follows:

$$T_C = \min(T_{1\_s}, T_{2\_1\%}) - \Sigma_{t=T_{1\_1\%}}^{\min(T_{1\_s}, T_{2\_1\%})} c(t)/c_0 - T_{CW}$$

$$T_{wait} = T_C - T_{RR} \text{ if } T_C > T_{RR}$$

$$T_{wait} = 2(T_{RR} - T_C) \text{ if } T_{RR} > T_C$$

in which, $T_{CW}$ represents a cleaning time under the interconnected mode with a unit of min; $T_{wait}$ is a waiting time with a unit of min; $T_{RR}$ is total time of elution, cleaning and regeneration with a unit of min.

(3) In case of a four-column continuous chromatography operating mode, the key operation parameters are referring to the feeding time and waiting time under the interconnected mode, where, the feeding time under the interconnected mode is the same as the calculation method of the three-column; and the calculation method of the waiting time is as follows:

$$T_{wait} = 2T_C - T_{RR} + T_{CW} \text{ if } T_C > (T_{RR} - T_{CW})/2$$

$$T_{wait} = 2(T_{RR} - 2T_C - T_{CW}) \text{ if } (T_{RR} - T_{CW})/2 > T_C$$

(4) In case of a N (N>4)-column continuous chromatography operating mode, the key operation parameters include number of columns, feeding time and waiting time under the interconnected mode; where, the feeding time of the interconnected mode is the same as the calculation method of the three-column; and the number of columns and the calculation method of the waiting time are as follows:

$$N = \left\lceil \frac{T_{RR} + T_{CW}}{T_C + T_{CW}} \right\rceil + 2$$

$$T_{wait} = (N-2)T_C + (N-3)T_{CW} - T_{RR}$$

in which, the symbol $\lceil \ \rceil$ is rounding up to an integer.

In specific application examples, for an evaluation model of the continuous chromatography, evaluation parameters mainly include process productivity and resin capacity utilization; and the calculation formula of the process productivity is as follows:

$$P_C = \frac{[T_C U_C + T_{DC} U_{DC}]c_0}{T_{cycle} CV} \times 60$$

in which, $P_C$ is a process productivity of continuous chromatography with a unit of g/L/min; $U_C$ is a feeding flow rate under the interconnected mode with a unit of mL/min; $T_{DC}$ is a feeding time under a disconnected mode with a unit of mine; CV is a column volume with a unit of mL; $T_{cycle}$ is total time required by running a cycle and back to the initial state with a unit of min.

The calculation formula of the resin capacity utilization is as follows:

$$CU_c = \frac{[T_C U_C + T_{DC} U_{Dc}]c_0}{\left(T_{1\_95\%} c_0 - \sum_{t=T_{1\_1\%}}^{T_{1\_95\%}} c(t)\right) U_C} \times 100\%$$

in which, CUC is resin capacity utilization of continuous chromatography with a unit of %; and $T_{1\_95\%}$ is a time point of 95% breakthrough of the one-column with a unit of min.

By the model and parameters set above, in the step 201 and the step 203, the training and application of the first artificial neural network mainly include the following steps:

(1) mechanistic model parameter set and breakthrough curve dataset:

In one embodiment, based on a chromatography mechanistic model, model parameters include related mass transfer parameters (including axial diffusion coefficient, liquid-film mass transfer coefficient, solid-phase mass transfer coefficient within the particle, liquid-phase mass transfer coefficient within the particle, etc.), related adsorption parameters (including saturated adsorption capacity, equilibrium desorption constant, etc.), and related operation parameters (including a superficial flow rate and feeding concentration, etc.); a random number was generated to the above each parameter within a range of 80%; and these random numbers were arranged according to a certain order to produce a mechanistic model parameter matrix, thus forming 100-10000 sets of mechanistic model parameter matrix; each group of parameters were substituted into mechanistic models to obtain the corresponding breakthrough curve by an orthogonal collocation method; the above steps were repeated to obtain a mechanistic model parameter set and the corresponding breakthrough curve dataset.

In another embodiment, an experimental method was used to choose different resins and operation parameters for an one-column protein breakthrough experiment. The experiment parameters include a superficial flow rate, feeding concentration, saturated adsorption capacity, and equilibrium desorption constant; where, the saturated adsorption capacity and the equilibrium desorption constant might be obtained by a static adsorption experiment; then 100-10000 experiments were performed to obtain a mechanistic model parameter set and corresponding breakthrough curve dataset.

(2) First artificial neural network training: feature points on the breakthrough curve of the breakthrough curve dataset were selected, namely, the feeding time reaching 10%-90% breakthrough points, and the feature points were subjected to normalization processing; the breakthrough curve feature points served as an input set and the corresponding mechanistic model parameters served as an output set; then the artificial neural network was trained and denoted as the first artificial neural network.

(3) Application of the first artificial neural network: the breakthrough curve data obtained by experiments was subjected to linear interpolation to obtain breakthrough curve feature points, and then the breakthrough curve feature points were substituted into the trained first artificial neural network for calculation, thus obtaining the corresponding model parameters in the mechanistic model.

In specific application examples, by the set models and parameters, in the step 202 and the step 204, the training and application of the second artificial neural network mainly include the followings:

(1) mechanistic model parameter set and breakthrough curve dataset:

In one embodiment, based on a chromatography mechanistic model, model parameters include related mass transfer parameters (including axial diffusion coefficient, liquid-film mass transfer coefficient, solid-phase mass transfer coefficient within the particle, liquid-phase mass transfer coefficient within the particle, etc.), related adsorption parameters (including saturated adsorption capacity, equilibrium desorption constant, etc.), and related operation parameters (including superficial flow rate and feeding concentration, etc.). A random number was generated to the above each parameter within a range of 80%; and these random numbers were arranged according to a certain order to produce a mechanistic model parameter matrix, thus forming 100-10000 sets of mechanistic model parameter matrix; each group of parameters were substituted into mechanistic models to obtain the corresponding one-column breakthrough curve and the twin-column breakthrough curve by an orthogonal collocation method; the above steps were repeated to obtain a mechanistic model parameter set and the corresponding breakthrough curve dataset.

In another embodiment, an experimental method was used to choose different resins and operation parameters for twin-column in-series protein breakthrough experiment. At this time, the experiment parameters include a superficial flow rate, feeding concentration, saturated adsorption capacity, and equilibrium desorption constant; where, the saturated adsorption capacity and the equilibrium desorption constant might be obtained by a static adsorption experiment; then 100-10000 sets of the above experiments were performed to obtain a mechanistic model parameter set and corresponding breakthrough curve dataset.

(2) Second artificial neural network training: feature points on the breakthrough curve of the breakthrough curve dataset were selected, namely, the feeding time and feeding quantity reaching 10%-90% breakthrough points; there were 1% breakthrough points on the twin-column breakthrough curve. The feature points on the breakthrough curve were subjected to extraction and normalization processing; the mechanistic model parameters served as an input set, and the corresponding breakthrough curve feature points served as an output set, and neural network was trained and denoted as the second artificial neural network.

(3) Application of the second artificial neural network: the selected residence time, feeding protein concentration and the above fitted mechanistic model parameters were merged, and substituted into the trained second artificial neural network for calculation, thus performing predicting to obtain breakthrough curve feature points under different chromatography operation parameters.

In specific application examples, the steps of re-performing the first artificial neural network training and the second artificial neural network training in the step 204 are as follows:

fitting the experimental breakthrough curve by a mechanistic model to obtain mechanistic model parameters under the experimental condition; randomly generating a new mechanistic model parameter set within a range of the mechanistic model parameters ±30% and substituting the mechanistic model parameter set into the mechanistic model to obtain a new breakthrough curve set; merging the new breakthrough curve set into the original breakthrough curve database, and respectively re-performing the first artificial neural network training and the second artificial neural network training by the above method.

In specific application examples, the process analysis of the continuous chromatography in the step 205 includes the following steps:

(1) substituting the predicted breakthrough curve feature points, basic operation parameters of the continuous chromatography (including the time of elution, cleaning and regeneration, column volume of washing under the interconnected mode, safety factor, etc.) and continuous chromatography design parameters (switching point, residence time, feeding protein concentration, etc.) into the above continuous chromatography model to obtain a process scheduling of the continuous chromatography process;

(2) evaluation parameter calculation step: substituting the design parameters and the process scheduling of the continuous chromatography obtained in the previous step into an evaluation model of the above continuous chromatography, and performing calculating to obtain a process productivity and a resin capacity utilization of the multi-column continuous chromatography.

In specific application examples, in the step 206, the operation space optimization of the continuous chromatography includes the following steps:

(1) process productivity contour diagram: generating a parameter matrix based on a design parameter range of the continuous chromatography, calculating process productivities for all the parameter points within the matrix according to the above method to obtain a process productivity matrix; and performing linear interpolation on the matrix and drawing a process productivity contour diagram under different operation conditions (including residence time, switching point and feeding protein concentration) for the process analysis and optimization of continuous chromatography;

(2) resin capacity utilization contour diagram: generating a parameter matrix based on a design parameter range of continuous chromatography, calculating resin capacity utilization to all the parameter points within the matrix according to the above method to obtain a resin capacity utilization matrix; and performing linear interpolation on the matrix and drawing a resin capacity utilization contour diagram under different operation conditions (including residence time, switching point and feeding protein concentration) for the process analysis and optimization of continuous chromatography;

(3) parameter optimization of the continuous chromatography: calculating a continuous chromatography design parameter range satisfying the separation target respectively in the process productivity contour diagram and in the resin capacity utilization contour diagram based on a specific separation target (process productivity and resin capacity utilization), and performing superposition on design parameter regions of the two diagrams to obtain continuous chromatography design parameters satisfying the requirements of process productivity and resin capacity utilization simultaneously, and calculating operation parameters and a process scheduling of the continuous chromatography process.

Further, to make the technical effect of the examples of the present invention more apparent, the implementation process of the present invention will be described in combination with figures and graphic examples.

Example 4 First Artificial Neural Network Training and Breakthrough Curve Fitting

Example 1 First Artificial Neural Network Training

Figure 8:
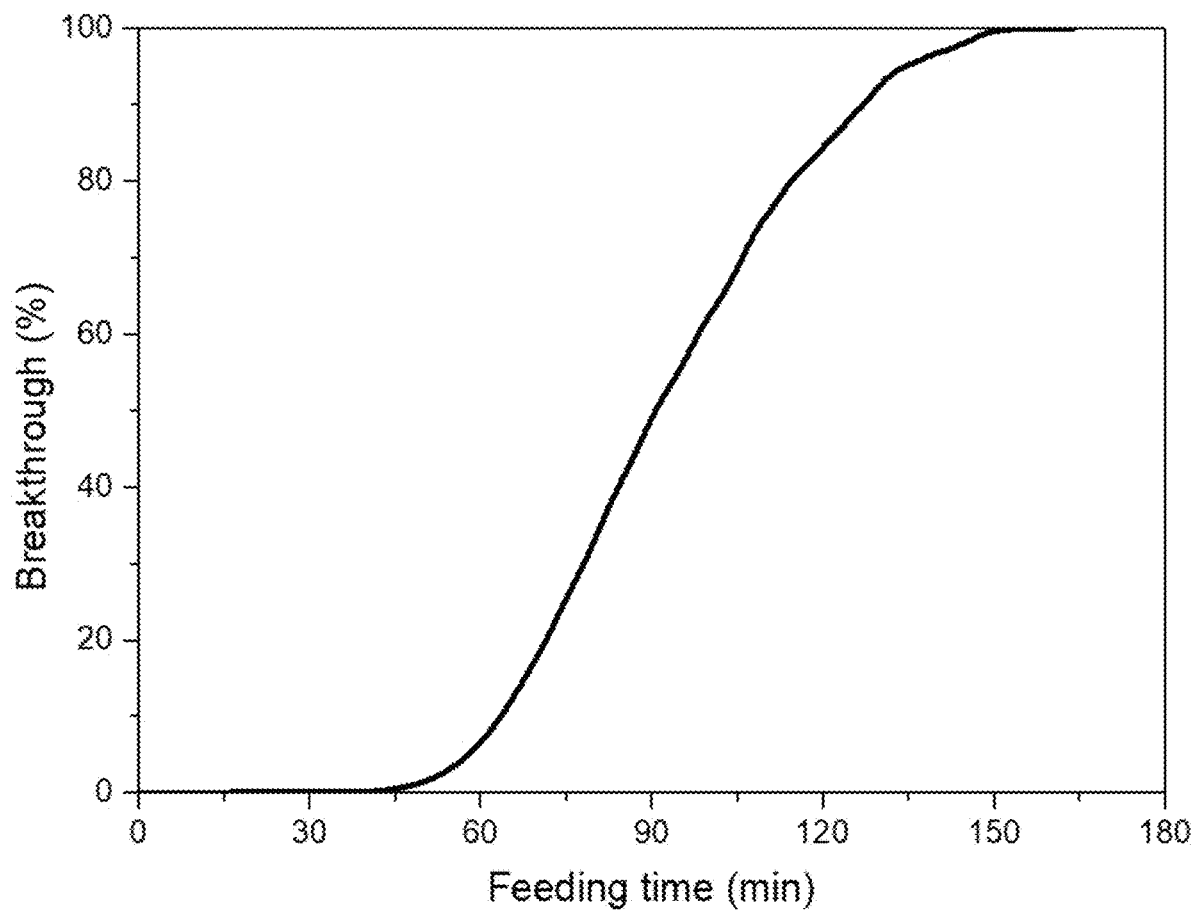
FIG. 8 is a schematic diagram showing a breakthrough curve of the first artificial neural network training in Example 4 of the present invention.

A set of mechanistic model parameters were randomly generated within a range of 80%: axial diffusion coefficient was $5*10^{-7}$ m$^2$/s; liquid-film mass transfer coefficient was $12*10^{-6}$ m/s; solid-phase mass transfer coefficient within the particle was $3*10^{-13}$ m$^2$/s; liquid-phase mass transfer coefficient within the particle was $9*10^{-12}$ m$^2$/s; saturated adsorption capacity was 110 mg/mL; and equilibrium desorption constant was 0.12 mg/mL; superficial flow rate was 0.5 mL/min, and feeding protein concentration was 2 mg/mL. The above parameters were substituted into a mechanistic model for calculation to obtain a breakthrough curve as shown in FIG. 8.

The mechanistic model parameter matrix is [5e−7, 12e−6, 3e−13, 9e−12, 110, 0.12, 0.5, 2].

2000 sets of mechanistic model parameter matrix constitute a mechanistic model parameter set and correspond to 2000 breakthrough curves to constitute a breakthrough curve dataset.

Feature points on the breakthrough curve were selected to achieve the time points of respectively reaching 10%, 20%, 30%, 40%, 50%, 60%, 70%, 80%, and 90% breakthrough; the matrix constituted by the feature points was [63.7, 71.6, 78.4, 84.2, 90.9, 98.3, 105.9, 114.7, 127.34]; the matrix was subjected to normalization to obtain a matrix [0.137, 0.135, 0.136, 0.136, 0.139, 0.142, 0.145, 0.145, 0.143]; all the breakthrough curve data was transformed into the above normalized matrix as an input set; then the mechanistic model parameter set was normalized as an output set; Levenberg-Marquardt was used as a training function, and RMSD was used as an objective function for artificial nerve training, after through 116 times of iteration, the error was $2.84*10^{-5}$, less than $1*10^{-3}$, being up to the training requirements, thereby obtaining the first artificial neural network.

(2) Breakthrough Curve Fitting

Figure 9:
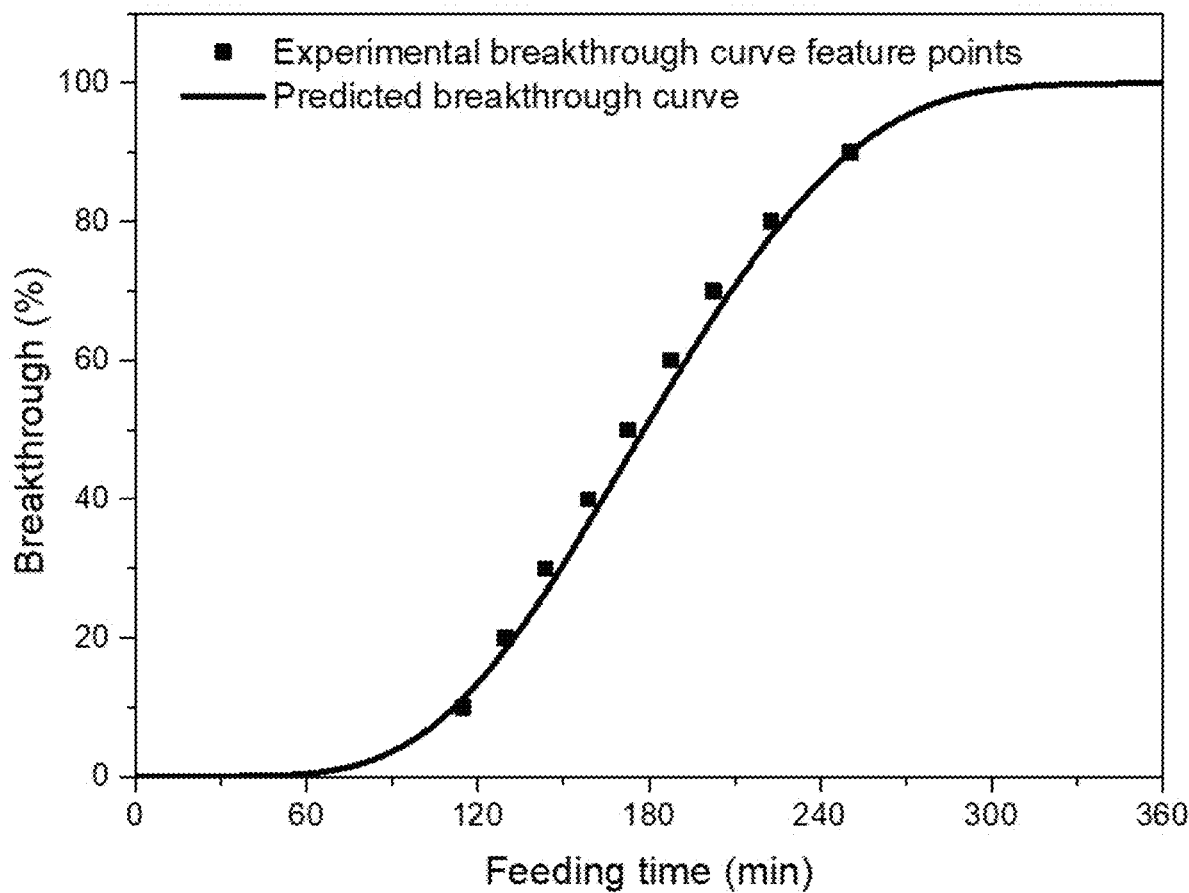
FIG. 9 shows a comparison between breakthrough curve feature points and a fitted result of the first artificial neural network in Example 4 of the present invention.

A Mabselect SuRE resin from GE Healthcare was used for IgG protein breakthrough experiment, where flow rate was 0.5 mL/min and feeding protein concentration was 1 mg/mL; the breakthrough curve was subjected to linear interpolation to obtain a matrix of time points reaching 10%-90% breakthrough [57.4, 64.9, 71.8, 79.3, 86.3, 93.8, 101.2, 111.4, 125.3]; the matrix was substituted into network 1, thus calculating to obtain a mechanistic model parameter matrix [2e−7, 2e−6, 4e−13, 1.3e−11, 90.1, 0.3, 0.5, 1]. FIG. 9 shows a comparison between an experimental breakthrough curve and a fitting breakthrough curve.

Figure 10:
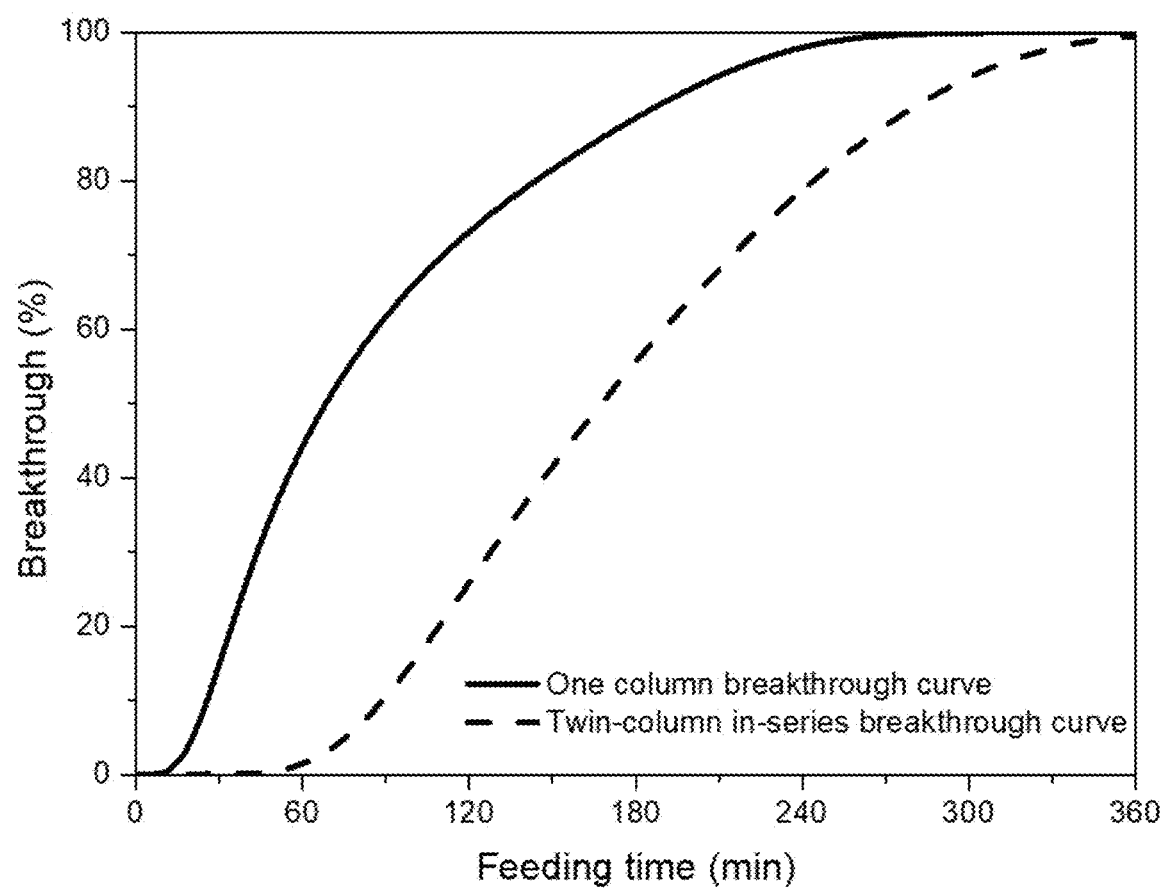
FIG. 10 is a schematic diagram showing two breakthrough curves in Example 5 of the present invention.

Example 5 Second Artificial Neural Network Training and Breakthrough Curve Fitting (1) Second Artificial Neural Network Training A set of mechanistic parameters were randomly generated within a range of 80%: axial diffusion coefficient was $3*10^{-7}$ m$^2$/s; liquid-film mass transfer coefficient was $18*10^{-6}$ m/s; solid-phase mass transfer coefficient within the particle was $4*10^{-13}$ m$^2$/s; liquid-phase mass transfer coefficient within the particle was $6*10^{-12}$ m$^2$/s; saturated adsorption capacity was 80 mg/mL; and equilibrium desorption constant was 0.2 mg/mL; superficial flow rate was 1 mL/min and feeding protein concentration was 1 mg/mL. The above parameters were substituted into a mechanistic model to obtain two answers. One is an one-column breakthrough curve and another one is a twin-column breakthrough curve during feeding via in-series two columns, as shown in FIG. 10.

The mechanistic model parameter matrix is [3e−7, 18e−6, 4e−13, 6e−12, 80, 0.2, 1, 1].

More than 3000 sets of mechanistic model parameters constitute a mechanistic model parameter set and correspond to more than 3000 breakthrough curves to constitute a breakthrough curve dataset.

Feature points on the breakthrough curve were selected, including the time point and feeding quantity when reaching to 10%-90% breakthrough, and the time point when the twin-column achieved 1% breakthrough; the matrix constituted by the feature points was [13.0, 17.4, 21.9, 27.4, 34.2, 43.2, 55.3, 72.1, 93.7, 0.31, 1.0, 2.1, 4.1, 7.3, 12.3, 20.2, 32.8, 51.2, 28.1]; all the breakthrough curve data was transformed into the above matrix, and subjected to normalization processing as an output set. The mechanistic model parameter set was normalized as an input set. Levenberg-Marquardt was used as a training function, and RMSD served as an objective function for artificial nerve training, after through 68 times of iteration, the error was $8.9*10^{-4}$, less than $1*10^{-3}$, being up to the training requirements, thus obtaining the second artificial neural network.

(2) Breakthrough Curve Prediction

Figure 11:
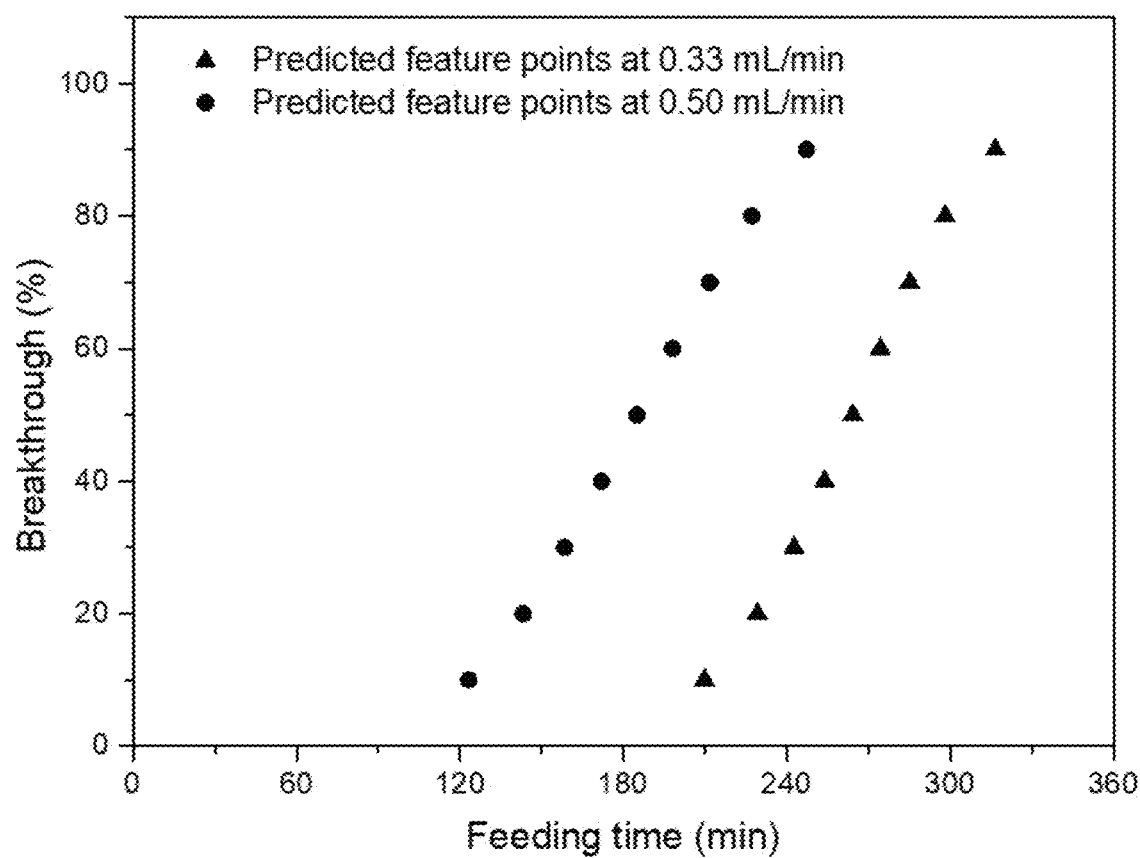
FIG. 11 shows a comparison between breakthrough curve feature points predicted by the second artificial neural network of Example 5 of the present invention and experimental breakthrough curve.

The resin Mabselect SuRE breakthrough experiment in Example 4 was used for fitting calculation to obtain a mechanistic model parameter matrix [2e−7, 2e−5, 4e−13, 1.3e−11, 90.1, 0.3, 0.5, 1]; and the matrix was substituted into the second artificial neural network to calculate breakthrough curve feature points at different protein concentrations and flow rates. For example, the predicted results at a concentration of 1 mg/mL and flow rates of 0.33 mL/min and 0.5 mL/min respectively are shown in FIG. 11.

Example 6 Process Analysis and Operation Space Optimization of the Continuous Chromatography (1) Process Analysis of the Continuous Chromatography The breakthrough curve with Mabselect SuRE resin, protein concentration $C_0$ of 1 mg/mL and flow rate of 1 mL/min was subjected to process analysis of the continuous chromatography. The design process is as follows:

Twin-column continuous chromatography design: the feeding flow rate $U_C$ of the interconnected mode was the same as that in the protein breakthrough experiment (1 mL/min); the feeding time $T_{DC}$ of the disconnected mode was the same as that in the total time $T_{RR}$ (26 min) of elution, cleaning and regeneration of the column; the washing column volume under the interconnected mode was 4 CV; and the washing flow rate under the interconnected mode was 1 mL/min, such that the washing time of $T_{CW}$=4 min under the interconnected mode could be obtained. Safety factor SF was set 0.9, switching point s was 80%; time $T_{1\_1\%}$ of the one-column to reach 1% breakthrough was 6.6 min; time $T_{1\_s\%}$ of the one-column to reach s breakthrough was 38.1 min; and time $T_{2\_1\%}$ of the twin-column to reach 1% breakthrough was 72.1 min. The feeding flow rate $U_{DC}$ under the disconnected mode and the feeding time $T_C$ under the interconnected mode are solved by the following the following two equations:

$$U_{DC} = \min\left(U_C, \frac{T_{1\_1\%}C_0 \Box SF - \sum_{t=T_{1\_1\%}}^{\min(T_{1\_s\%}, T_{2\_1\%})} c(t)}{T_{DC}c_0}U_C\right) = 0.06 \text{ (mL/min)}$$

-continued $$T_C = (\min(T_{1\_s}, T_{2\_1\%}) - T_{1\_1\%}) +$$

$$\frac{\left(T_{1\_1\%}c_0 - \sum_{t=T_{1\_1\%}}^{\min(T_{1\_s}, T_{2\_1\%})} c(t)\right)U_C - U_{DC}T_{DC}c_0}{c_0 U_C} = 37.3 \text{ (min)}$$

Three-column continuous chromatography design: values of the $T_{1\_1\%}$, $T_{1\_s\%}$, $T_{2\_1\%}$, $T_{CW}$ and $T_{RR}$ are the same as those above.

$$T_C = \min(T_{1\_s}, T_{2\_1\%}) - \sum_{t=T_{1\_1\%}}^{\min(T_{1\_s}, T_{2\_1\%})} c(t)/c_0 - T_{CW} 35.3 \text{ (min)}$$

Because $T_C > T_{RR}$, $T_{wait} = 2 \times (T_C - T_{RR}) = 9.3$ (min)

Four-column continuous chromatography design: values of the $T_C$, $T_{CW}$ and $T_{RR}$ are the same as those above.

$T_C$ is the same as the three-column continuous chromatography process.

Because $T_C > (T_{RR} - T_{CW})/2$, $T_{wait} = 2T_C - T_{RR} + T_{CW} = 14.5$ (min)

N-column continuous chromatography design: values of the $T_C$, $T_{CW}$ and $T_{RR}$ are the same as those above.

The formula $$N = \left[\frac{T_{RR} + T_{CW}}{T_C + T_{CW}}\right] + 2 = 3$$

indicates a three-column system suitable for continuous chromatography.

(2) Process Evaluation and Operation Space Optimization of the Continuous Chromatography The twin-column continuous chromatography was set as an example, and the above obtained operation parameters were substituted into the equations of process productivity and resin capacity utilization, where, time $T_{cycle}$ of the twin-column of running a cycle is 134.5 min; time $T_{1\_95\%}$ of the one-column of reaching 95% breakthrough is 107.8 min; and column volume CV is 1 mL. The following values may be obtained:

$$P_C = \frac{[T_C U_C + T_{DC} U_{DC}]c_0}{T_{cycle} CV} \times 60 = 17.3 (g/L/h)$$

$$CU_C = \frac{[T_C U_C + T_{DC} U_{DC}]c_0}{\left(T_{1\_95\%}c_0 - \sum_{t=T_{1\_1\%}}^{T_{1\_95\%}} c(t)\right)U_C} \times 100\% = 78\%$$

Figure 12:
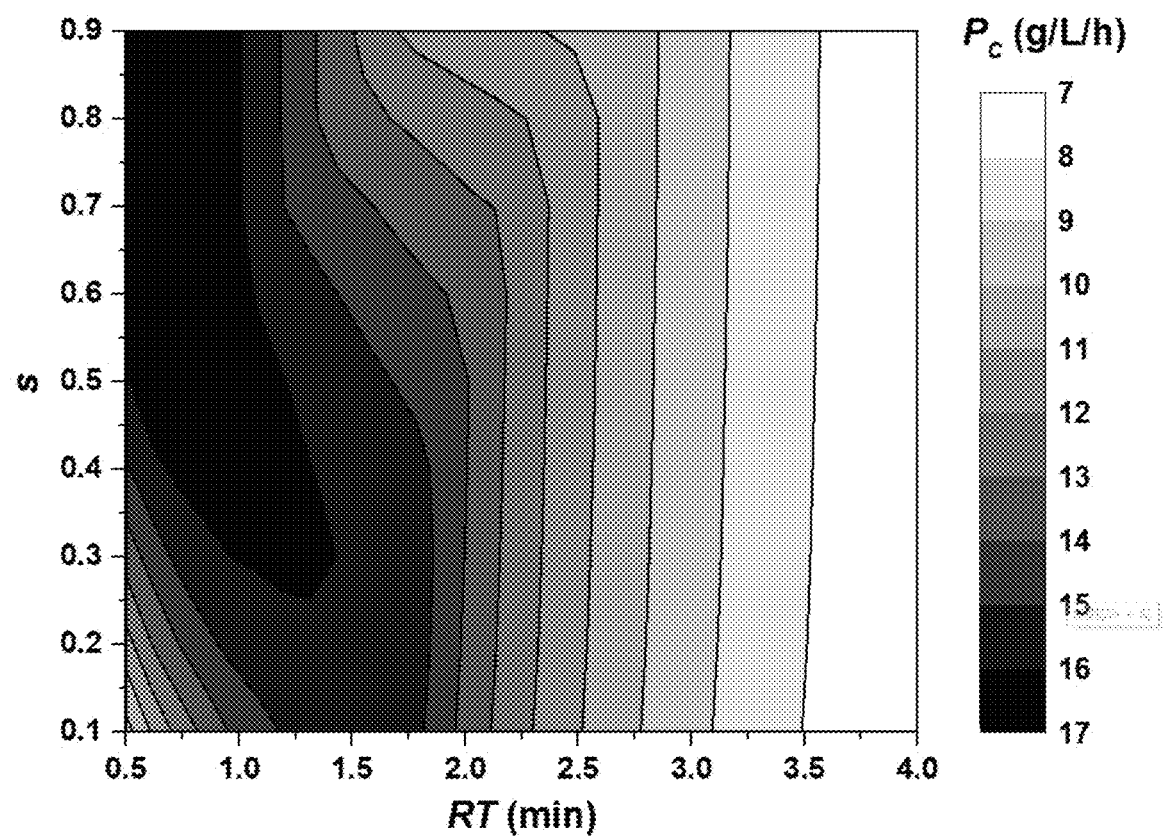
FIG. 12 shows a process productivity contour diagram of twin-column continuous chromatography in Example 6 of the present invention.
Figure 13:
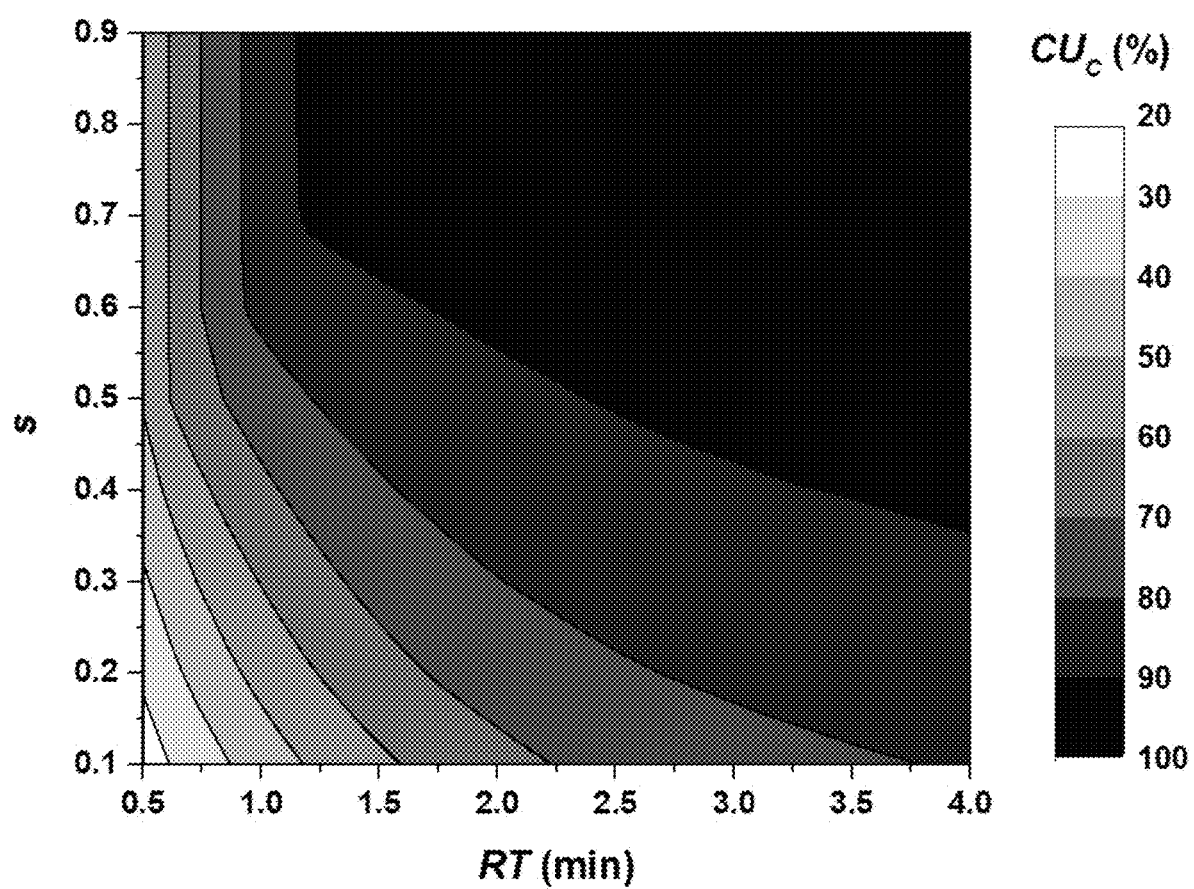
FIG. 13 shows a resin capacity utilization contour diagram of twin-column continuous chromatography in Example 6 of the present invention.

The different switching point parameters (0.1, 0.2, ..., 0.9) and different residence time parameters (0.5, 1, 1.5, 2, 2.5, 3, 3.5 and 4 min) were substituted into the above twin-column continuous chromatography design and evaluation equations, thus obtaining process productivity matrix and resin capacity utilization matrix of the twin-column continuous chromatography process. The matrixes were subjected to linear interpolation to obtain a process productivity contour diagram and a resin capacity utilization contour diagram, as shown in FIGS. 12-13.

Figure 14:
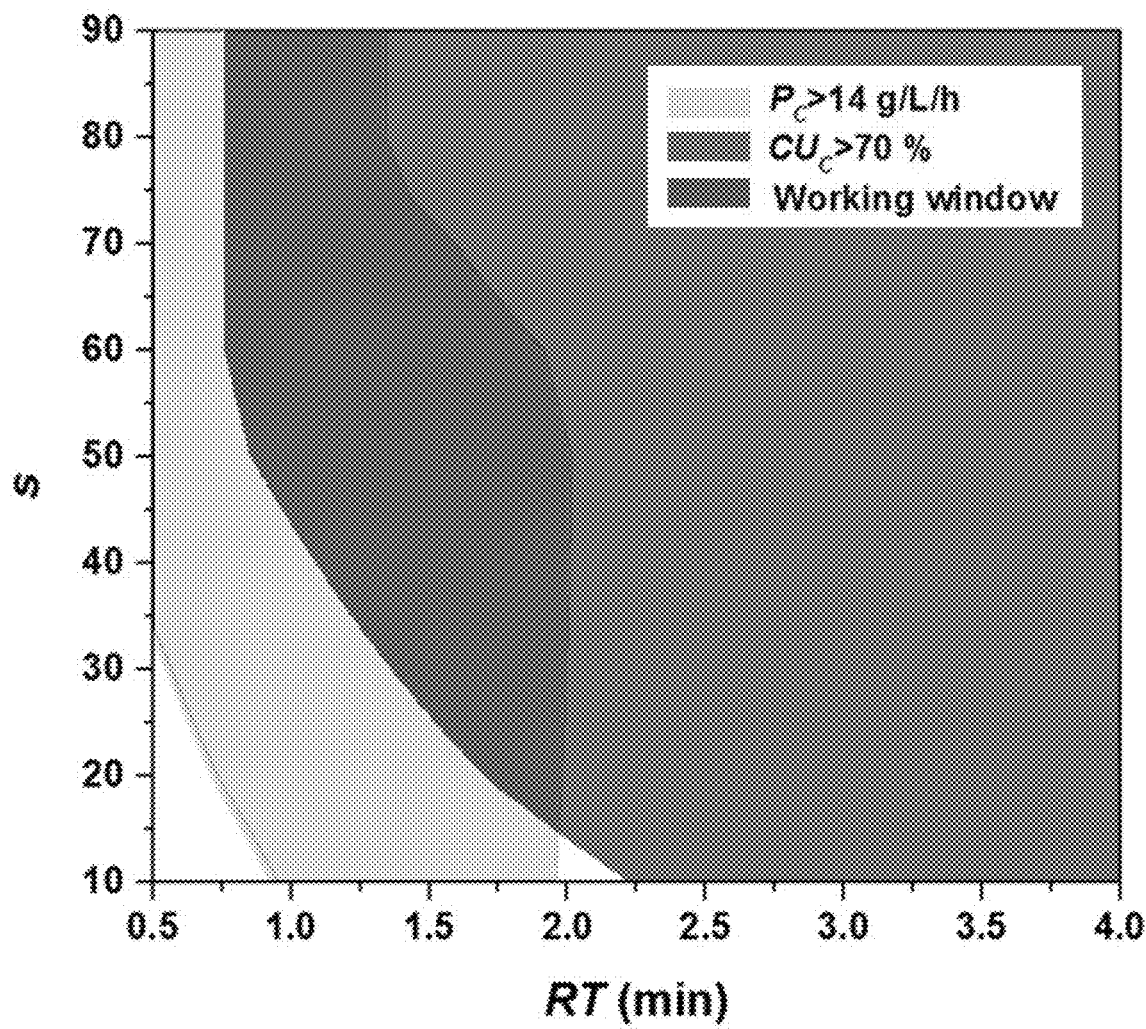
FIG. 14 is a schematic diagram showing an operation space of the continuous chromatography obtained according to a separation target in Example 6 of the present invention.

When a separation target was input, and if the process productivity was higher than 17 g/L/h and the resin capacity utilization was higher than 70%, an intersection with a process productivity higher than 17 g/L/h and a resin capacity utilization higher than 70% could be obtained in the above two contour charts according to the separation target, namely, a suitable operation space, as shown in FIG. 14.

It should be understood that exemplary examples described herein are illustrative, but nonrestrictive. Even though one or more examples of the present invention are described in combination with the accompanying drawings, a person skilled in the art shall understand that various forms and details of variations may be made within the spirit and scope of the present invention defined in the claims.

The invention claimed is:

1. A method for realizing multi-column continuous chromatography design and analysis based on a chromatography model for protein separation, comprising the following steps:

step 101, experimental breakthrough curve fitting:
conducting a single-column breakthrough experiment using Protein A resin and a protein feed solution at a flow rate of 1 mL/min and a protein concentration of 2 mg/mL, wherein feeding is stopped at 95% breakthrough concentration to obtain an experimental breakthrough curve;
substituting the experimental breakthrough curve and chromatography operation parameters into a chromatography mechanistic model that incorporates an axial diffusion coefficient, liquid-film mass transfer coefficient, solid-phase and liquid-phase mass transfer coefficients, saturated adsorption capacity, and equilibrium desorption constant;
fitting the breakthrough curve by calculating a simulated breakthrough curve using an orthogonal collocation method and iteratively optimizing model parameters by minimizing a root mean square deviation (RMSD) objective function, thereby obtaining fitted mechanistic model parameters;

step 102, breakthrough curve prediction:
defining a chromatography operating range, wherein a flow rate is set between 0.33 mL/min and 3 mL/min and a protein concentration is set between 0.5 mg/mL and 5 mg/mL;
substituting the fitted mechanistic model parameters obtained in step 101 and the defined chromatography operation parameters into the chromatography mechanistic model to calculate one-column breakthrough curves and twin-column in-series breakthrough curves at different flow rates and protein concentrations, wherein the protein concentration profile of the one-column breakthrough curve serves as a feed concentration input for the second column in the twin-column configuration;

step 103, process analysis of continuous chromatography:
substituting the breakthrough curves predicted in step 102 and basic continuous chromatography operation parameters comprising an interconnected feeding flow rate, a switching points, a washing flow rate, a washing column volume, a safety factor, a total time of elution, cleaning and regeneration, into a continuous chromatography model;
determining design parameters comprising a disconnected feeding flow rate, an interconnected feeding time and a waiting time;
analyzing influence of operation parameter variations on performance indexes comprising process productivity and resin capacity utilization for the multi-column continuous chromatography process; and step 104, operation space optimization of the continuous chromatography:

determining a suitable process based on a specific separation target and operational requirements of productivity of at least 40 g/L/h and resin capacity utilization of at least 80%;

generating process productivity and resin capacity utilization matrices by varying switching point parameters ranging from 0.1 to 0.9 and residence times ranging from 0.33 min to 3 min;

performing linear interpolation on the matrices to obtain process productivity and resin capacity utilization contour diagrams;

identifying an optimal operation space by locating intersections where both process productivity and resin capacity utilization satisfy the operational requirements, thereby defining the optimized continuous chromatography design parameters.

2. The method for realizing multi-column continuous chromatography design and analysis based on a chromatography model according to claim 1, wherein the experimental breakthrough curve fitting in the step 101 further comprises the following steps:

substituting the experimental operation parameters of the breakthrough curve and initial values of the model parameters into the chromatography mechanistic model to calculate a breakthrough curve, and comparing the calculated result with the breakthrough curve obtained by experiments; and changing the chromatography model parameters to minimize a root mean square error (RMSD) thereof to obtain chromatography model parameters, thus realizing the breakthrough curve fitting.

3. The method for realizing multi-column continuous chromatography design and analysis based on a chromatography model according to claim 1, wherein the breakthrough curve prediction in the step 102 further comprises the following steps:

setting a flow rate and a protein concentration range of the chromatography operation, and generating a chromatography operation parameter matrix within the range and merging with the mechanistic model parameters obtained in the step 101, and substituting into the chromatography model for calculation, and performing predicting to obtain the one-column and twin-column in-series breakthrough curves at different flow rates and different protein concentrations.

4. The method for realizing multi-column continuous chromatography design and analysis based on a chromatography model according to claim 1, wherein the process analysis of the continuous chromatography comprises the following steps:

substituting the predicted breakthrough curve and the basic operation parameters of the continuous chromatography into the continuous chromatography model to obtain process design parameters and a process scheduling of the continuous chromatography;

substituting the obtained process design parameters and the process scheduling of the continuous chromatography into an evaluation model of the continuous chromatography, and performing calculating to obtain process productivity and resin capacity utilization of the multi-column continuous chromatography.

5. The method for realizing multi-column continuous chromatography design and analysis based on a chromatography model according to claim 1, wherein the operation space of the continuous chromatography comprises the following steps:

generating a parameter matrix based on a design parameter range of the continuous chromatography, calculating process productivities for all the parameter points within the parameter matrix to obtain a process productivity matrix; and performing linear interpolation on the process productivity matrix and drawing a process productivity contour diagram under different operation conditions for the process analysis and optimization of the continuous chromatography;

generating a parameter matrix based on a design parameter range of the continuous chromatography, calculating resin capacity utilization to all the parameter points within the parameter matrix to obtain a resin capacity utilization matrix; and performing linear interpolation on the resin capacity utilization matrix and drawing a resin capacity utilization contour diagram under different operation conditions for the process analysis and optimization of the continuous chromatography;

calculating a continuous chromatography design parameter range satisfying the separation target respectively in the process productivity contour diagram and in the resin capacity utilization contour diagram based on the specific separation target, and performing superposition on design parameter regions of the two diagrams to obtain design parameters of continuous chromatography satisfying the requirements of process productivity and resin capacity utilization simultaneously, and calculating operation parameters and process scheduling of the continuous chromatography process.

6. The method for realizing multi-column continuous chromatography design and analysis based on a chromatography model according to claim 1, wherein the chromatography model is a General Rate Model taking parallel diffusion into consideration.

7. The method for realizing multi-column continuous chromatography design and analysis based on a chromatography model according to claim 1, wherein:

the continuous chromatography model is a continuous chromatography design model established according to different operating modes; evaluation parameters of continuous chromatography mainly comprise process productivity and resin capacity utilization, wherein the different operating modes comprise twin-column, three-column, four-column, and N-column (N>4).

* * * * *